US011128812B2

(12) United States Patent
Christensen et al.

(10) Patent No.: US 11,128,812 B2
(45) Date of Patent: Sep. 21, 2021

(54) GENERATING CONTENT FOR A VIRTUAL REALITY SYSTEM

(71) Applicant: VERIZON PATENT AND LICENSING INC., Basking Ridge, NJ (US)

(72) Inventors: Jens Christensen, San Mateo, CA (US); Thomas M. Annau, San Mateo, CA (US); Arthur Van Hoff, San Mateo, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/585,157

(22) Filed: May 2, 2017

(65) Prior Publication Data
US 2017/0236149 A1    Aug. 17, 2017

Related U.S. Application Data

(62) Division of application No. 14/465,570, filed on Aug. 21, 2014, now Pat. No. 10,708,568.
(Continued)

(51) Int. Cl.
*G06Q 30/02* (2012.01)
*H04N 5/247* (2006.01)
(Continued)

(52) U.S. Cl.
CPC ............. *H04N 5/247* (2013.01); *G06F 3/013* (2013.01); *G06F 3/04815* (2013.01);
(Continued)

(58) Field of Classification Search
CPC ....................................... G06Q 30/0207–0277
(Continued)

(56) References Cited

U.S. PATENT DOCUMENTS

| 4,507,683 A | 3/1985 | Griesshaber et al. |
| 5,495,576 A | 2/1996 | Ritchey |

(Continued)

FOREIGN PATENT DOCUMENTS

| RU | 2382406 | 2/2010 | |
| RU | 2421933 | 6/2011 | |
| WO | WO-2012113988 A1 * | 8/2012 | ......... G06Q 30/0261 |

OTHER PUBLICATIONS

G. Nick Bilton and Claire Cain Miller, "How Pay-Per Gaze Advertising Could Work With Google Glasses", retrieved from https://bits.blogs.nytimes.com/2013/08/20/google-patents-real-world-pay-per-gaze-advertising/ (Year: 2013).*

(Continued)

*Primary Examiner* — Sam Refai

(57) ABSTRACT

The disclosure includes a system and method for generating virtual reality content. For example, the disclosure includes a method for generating virtual reality content that includes a stream of three-dimensional video data and a stream of three-dimensional audio data with a processor-based computing device programmed to perform the generating, providing the virtual reality content to a user, detecting a location of the user's gaze at the virtual reality content, and suggesting an advertisement based on the location of the user's gaze. Another example includes receiving virtual reality content that includes a stream of three-dimensional video data and a stream of three-dimensional audio data to a first user with a processor-based computing device programmed to perform the receiving, generating a social network for the first user, and generating a social graph that includes user interactions with the virtual reality content.

21 Claims, 11 Drawing Sheets

Related U.S. Application Data

(60) Provisional application No. 61/868,527, filed on Aug. 21, 2013, provisional application No. 62/004,645, filed on May 29, 2014, provisional application No. 62/008,215, filed on Jun. 5, 2014, provisional application No. 62/029,254, filed on Jul. 25, 2014.

(51) Int. Cl.
| | |
|---|---|
| *H04N 5/232* | (2006.01) |
| *H04N 13/106* | (2018.01) |
| *H04N 13/111* | (2018.01) |
| *H04N 13/243* | (2018.01) |
| *H04N 13/271* | (2018.01) |
| *G06T 3/40* | (2006.01) |
| *G06T 7/00* | (2017.01) |
| *G11B 27/11* | (2006.01) |
| *G11B 27/34* | (2006.01) |
| *G11B 31/00* | (2006.01) |
| *G06F 3/0481* | (2013.01) |
| *G06F 3/0484* | (2013.01) |
| *G06F 3/01* | (2006.01) |
| *G06Q 50/00* | (2012.01) |
| *G06T 19/00* | (2011.01) |
| *H04N 13/189* | (2018.01) |
| *H04N 13/117* | (2018.01) |
| *H04N 13/282* | (2018.01) |
| *H04N 7/18* | (2006.01) |
| *H04N 13/204* | (2018.01) |

(52) U.S. Cl.
CPC ..... *G06F 3/04847* (2013.01); *G06Q 30/0241* (2013.01); *G06Q 30/0246* (2013.01); *G06Q 30/0251* (2013.01); *G06Q 30/0263* (2013.01); *G06Q 30/0269* (2013.01); *G06Q 30/0277* (2013.01); *G06Q 50/01* (2013.01); *G06T 3/4038* (2013.01); *G06T 7/97* (2017.01); *G06T 19/006* (2013.01); *G11B 27/11* (2013.01); *G11B 27/34* (2013.01); *G11B 31/006* (2013.01); *H04N 5/23238* (2013.01); *H04N 13/106* (2018.05); *H04N 13/111* (2018.05); *H04N 13/117* (2018.05); *H04N 13/189* (2018.05); *H04N 13/243* (2018.05); *H04N 13/271* (2018.05); *H04N 13/282* (2018.05); *G06Q 30/0273* (2013.01); *G06Q 30/0284* (2013.01); *G06T 2207/10012* (2013.01); *G06T 2207/20228* (2013.01); *H04N 7/181* (2013.01); *H04N 13/204* (2018.05)

(58) Field of Classification Search
USPC .............................................. 705/14.1–14.73
See application file for complete search history.

(56) References Cited

U.S. PATENT DOCUMENTS

| | | | |
|---|---|---|---|
| 6,128,108 A | 10/2000 | Teo | |
| 6,141,034 A | 10/2000 | McCutchen | |
| 6,212,468 B1 | 4/2001 | Nakayama et al. | |
| 6,747,644 B1 | 6/2004 | Deering | |
| 6,767,287 B1 | 7/2004 | Mcquaid et al. | |
| 6,865,289 B1 | 3/2005 | Berestov | |
| 7,155,680 B2 | 12/2006 | Akazawa et al. | |
| 7,884,848 B2 | 2/2011 | Ginther | |
| 8,478,111 B2 | 7/2013 | Stankiewicz et al. | |
| 8,581,961 B2 | 11/2013 | Lee | |
| 8,644,596 B1 | 2/2014 | Wu et al. | |
| 8,681,224 B2 | 3/2014 | Mallon et al. | |
| 8,750,509 B2 | 6/2014 | Renkis | |
| 8,848,066 B2 | 9/2014 | Porter et al. | |
| 8,867,827 B2 | 10/2014 | Yeatman, Jr. et al. | |
| 9,001,226 B1 | 4/2015 | Ng et al. | |
| 9,262,831 B2 | 2/2016 | Munzenmayer et al. | |
| 9,264,598 B1 | 2/2016 | Baldwin | |
| 9,282,367 B2 | 3/2016 | Daub | |
| 9,396,588 B1 | 7/2016 | Li | |
| 9,589,350 B1 | 3/2017 | Kozko | |
| 9,742,991 B2 | 8/2017 | Latorre | |
| 9,774,887 B1 | 9/2017 | Walkingshaw | |
| 9,911,454 B2 | 3/2018 | Van Hoff et al. | |
| 10,210,898 B2 | 2/2019 | Van Hoff et al. | |
| 10,313,665 B2 | 6/2019 | Walkingshaw | |
| 10,440,398 B2 | 10/2019 | Walkingshaw et al. | |
| 10,694,167 B1 | 6/2020 | Van Hoff et al. | |
| 2001/0015751 A1 | 8/2001 | Geng | |
| 2002/0075295 A1 | 6/2002 | Stentz et al. | |
| 2002/0171741 A1 | 11/2002 | Tonkin et al. | |
| 2003/0025805 A1 | 2/2003 | Yamagishi | |
| 2003/0117488 A1 | 6/2003 | Pierce et al. | |
| 2004/0008256 A1 | 1/2004 | Kim | |
| 2004/0027451 A1 | 2/2004 | Baker | |
| 2004/0066449 A1* | 4/2004 | Givon | H04N 13/282 348/48 |
| 2004/0196378 A1 | 10/2004 | Kannermark et al. | |
| 2004/0246333 A1 | 12/2004 | Steuart | |
| 2005/0062869 A1 | 3/2005 | Zimmerman et al. | |
| 2005/0069167 A1 | 3/2005 | Zarrabizadeh | |
| 2006/0082663 A1 | 4/2006 | Rooy et al. | |
| 2007/0027844 A1 | 2/2007 | Toub et al. | |
| 2007/0035627 A1 | 2/2007 | Cleary et al. | |
| 2007/0097206 A1 | 5/2007 | Houvener et al. | |
| 2007/0146530 A1 | 6/2007 | Nose | |
| 2007/0159527 A1 | 7/2007 | Kim et al. | |
| 2007/0263076 A1 | 11/2007 | Andrews et al. | |
| 2008/0091526 A1 | 4/2008 | Shoemaker | |
| 2008/0143842 A1 | 6/2008 | Gillard et al. | |
| 2008/0262910 A1 | 10/2008 | Altberg et al. | |
| 2008/0263458 A1 | 10/2008 | Altberg et al. | |
| 2009/0076894 A1 | 3/2009 | Bates | |
| 2009/0238378 A1 | 9/2009 | Kikinis et al. | |
| 2009/0249244 A1 | 10/2009 | Robinson et al. | |
| 2009/0288002 A1 | 11/2009 | Hamilton, II et al. | |
| 2010/0036735 A1 | 2/2010 | Hamilton et al. | |
| 2010/0045773 A1 | 2/2010 | Ritchey | |
| 2010/0083139 A1 | 4/2010 | Dawson et al. | |
| 2010/0097444 A1 | 4/2010 | Lablans | |
| 2010/0100429 A1 | 4/2010 | McCloskey et al. | |
| 2010/0119105 A1 | 5/2010 | Moriya et al. | |
| 2010/0141733 A1 | 6/2010 | Borchers et al. | |
| 2010/0164956 A1* | 7/2010 | Hyndman | G06Q 10/08 345/427 |
| 2010/0169842 A1 | 7/2010 | Migos | |
| 2010/0315479 A1 | 12/2010 | Wijngaarden et al. | |
| 2010/0318467 A1 | 12/2010 | Porter et al. | |
| 2010/0332980 A1* | 12/2010 | Sun | G06F 3/04815 715/706 |
| 2011/0058749 A1* | 3/2011 | Cooper | G06T 7/33 382/218 |
| 2011/0142132 A1 | 6/2011 | Tourapis et al. | |
| 2011/0157305 A1 | 6/2011 | Kosakai et al. | |
| 2011/0193956 A1 | 8/2011 | Gilg et al. | |
| 2011/0267510 A1 | 11/2011 | Malone et al. | |
| 2012/0050474 A1 | 3/2012 | Segall | |
| 2012/0056977 A1 | 3/2012 | Ohnishi | |
| 2012/0069236 A1 | 3/2012 | Namba et al. | |
| 2012/0105632 A1 | 5/2012 | Renkis | |
| 2012/0113278 A1 | 5/2012 | Okada | |
| 2012/0155786 A1 | 6/2012 | Zargarpour et al. | |
| 2012/0162362 A1 | 6/2012 | Garden et al. | |
| 2012/0169842 A1 | 7/2012 | Chuang et al. | |
| 2012/0194712 A1 | 8/2012 | Crook et al. | |
| 2012/0203640 A1 | 8/2012 | Karmarkar et al. | |
| 2012/0218296 A1 | 8/2012 | Belimpasakis et al. | |
| 2012/0218376 A1 | 8/2012 | Athan | |
| 2012/0232998 A1 | 9/2012 | Schoen | |
| 2012/0240077 A1 | 9/2012 | Vaittinen et al. | |
| 2012/0242788 A1 | 9/2012 | Chuang et al. | |
| 2012/0242794 A1 | 9/2012 | Park et al. | |
| 2012/0257095 A1 | 10/2012 | Velazquez | |

(56) References Cited

U.S. PATENT DOCUMENTS

| | | |
|---|---|---|
| 2012/0290401 A1 | 11/2012 | Neven |
| 2012/0310717 A1 | 12/2012 | Kankainen |
| 2012/0324493 A1 | 12/2012 | Holmdahl et al. |
| 2012/0324494 A1 | 12/2012 | Burger et al. |
| 2013/0016186 A1 | 1/2013 | Atanassov et al. |
| 2013/0031475 A1 | 1/2013 | Maor et al. |
| 2013/0035110 A1 | 2/2013 | Sridhara et al. |
| 2013/0044187 A1 | 2/2013 | Hammes et al. |
| 2013/0054576 A1 | 2/2013 | Karmarkar et al. |
| 2013/0080974 A1 | 3/2013 | Suzuki |
| 2013/0083159 A1 | 4/2013 | Ooshima |
| 2013/0103624 A1 | 4/2013 | Thieberger |
| 2013/0117375 A1 | 5/2013 | Bist et al. |
| 2013/0124471 A1 | 5/2013 | Chen et al. |
| 2013/0188010 A1 | 7/2013 | Dortch et al. |
| 2013/0212606 A1 | 8/2013 | Kannan et al. |
| 2013/0223537 A1 | 8/2013 | Kasai et al. |
| 2013/0235347 A1 | 9/2013 | Hennessey et al. |
| 2013/0250047 A1 | 9/2013 | Hollinger |
| 2013/0258044 A1 | 10/2013 | Betts-Lacroix |
| 2013/0259447 A1 | 10/2013 | Sathish et al. |
| 2013/0266211 A1 | 10/2013 | Tippetts et al. |
| 2013/0278631 A1* | 10/2013 | Border .............. G06F 3/04842 345/633 |
| 2013/0278635 A1 | 10/2013 | Maggiore |
| 2014/0005484 A1 | 1/2014 | Charles |
| 2014/0067828 A1 | 3/2014 | Archibong et al. |
| 2014/0071234 A1 | 3/2014 | Millett |
| 2014/0086446 A1 | 3/2014 | Han et al. |
| 2014/0089097 A1 | 3/2014 | Byun et al. |
| 2014/0097251 A1 | 4/2014 | Joussen et al. |
| 2014/0099022 A1 | 4/2014 | McNamer |
| 2014/0099623 A1 | 4/2014 | Amit et al. |
| 2014/0104378 A1 | 4/2014 | Kauff et al. |
| 2014/0125774 A1 | 5/2014 | Lee et al. |
| 2014/0126066 A1 | 5/2014 | Clavin et al. |
| 2014/0132788 A1 | 5/2014 | Ramsay et al. |
| 2014/0146132 A1 | 5/2014 | Bagnato et al. |
| 2014/0153916 A1 | 6/2014 | Kintner |
| 2014/0176749 A1 | 6/2014 | Horowitz |
| 2014/0184550 A1 | 7/2014 | Hennessey et al. |
| 2014/0201126 A1 | 7/2014 | Zadeh et al. |
| 2014/0232822 A1 | 8/2014 | Venkataraman et al. |
| 2014/0237495 A1 | 8/2014 | Jang et al. |
| 2014/0245335 A1 | 8/2014 | Holden et al. |
| 2014/0247352 A1 | 9/2014 | Rathi et al. |
| 2014/0267596 A1 | 9/2014 | Geerds |
| 2014/0270684 A1 | 9/2014 | Jayaram et al. |
| 2014/0280549 A1 | 9/2014 | Rajan et al. |
| 2014/0285486 A1 | 9/2014 | Chang et al. |
| 2014/0300532 A1* | 10/2014 | Karkkainen ............ G06F 3/012 345/156 |
| 2014/0309495 A1 | 10/2014 | Kirma et al. |
| 2014/0310630 A1 | 10/2014 | Asikainen et al. |
| 2014/0320608 A1 | 10/2014 | Muukki |
| 2014/0341484 A1 | 11/2014 | Sebring |
| 2014/0359647 A1 | 12/2014 | Shoemake et al. |
| 2014/0359656 A1 | 12/2014 | Banica et al. |
| 2014/0368609 A1 | 12/2014 | Chang et al. |
| 2015/0012827 A1 | 1/2015 | Elmeih et al. |
| 2015/0026718 A1 | 1/2015 | Seyller |
| 2015/0042953 A1 | 2/2015 | Teller |
| 2015/0050006 A1 | 2/2015 | Sipe |
| 2015/0058630 A1 | 2/2015 | Bae et al. |
| 2015/0067708 A1 | 3/2015 | Jensen et al. |
| 2015/0124088 A1 | 5/2015 | Vera et al. |
| 2015/0130705 A1 | 5/2015 | Im |
| 2015/0138065 A1 | 5/2015 | Alfieri |
| 2015/0169076 A1 | 6/2015 | Cohen et al. |
| 2015/0199006 A1 | 7/2015 | He et al. |
| 2015/0206329 A1 | 7/2015 | Devries |
| 2015/0208131 A1 | 7/2015 | Chatter et al. |
| 2015/0220768 A1 | 8/2015 | Ronnecke et al. |
| 2015/0235434 A1 | 8/2015 | Miller et al. |
| 2015/0248918 A1 | 9/2015 | Tang |
| 2015/0260526 A1 | 9/2015 | Paduano et al. |
| 2015/0264092 A1 | 9/2015 | Herger et al. |
| 2015/0271483 A1 | 9/2015 | Sun et al. |
| 2015/0309310 A1 | 10/2015 | Cho et al. |
| 2015/0316982 A1 | 11/2015 | Miller |
| 2015/0317353 A1 | 11/2015 | Zavesky |
| 2015/0348580 A1 | 12/2015 | Van Hoff et al. |
| 2015/0350561 A1 | 12/2015 | Vartanian |
| 2015/0356371 A1 | 12/2015 | Libal et al. |
| 2015/0373266 A1 | 12/2015 | Hsieh et al. |
| 2015/0379697 A1 | 12/2015 | Pohl |
| 2016/0011658 A1 | 1/2016 | Lopez et al. |
| 2016/0026253 A1 | 1/2016 | Bradski et al. |
| 2016/0027216 A1 | 1/2016 | Da Veiga et al. |
| 2016/0037026 A1 | 2/2016 | Kintner |
| 2016/0037030 A1 | 2/2016 | Weissig et al. |
| 2016/0050370 A1 | 2/2016 | Campbell |
| 2016/0077710 A1 | 3/2016 | Lewis et al. |
| 2016/0156842 A1 | 6/2016 | Baldwin |
| 2016/0279516 A1 | 9/2016 | Gupta et al. |
| 2016/0286137 A1 | 9/2016 | Marks et al. |
| 2016/0295194 A1 | 10/2016 | Wang et al. |
| 2016/0306431 A1 | 10/2016 | Stafford et al. |
| 2017/0278306 A1 | 9/2017 | Rico |
| 2017/0280056 A1 | 9/2017 | Chapdelaine-Couture et al. |
| 2017/0329817 A1 | 11/2017 | Stoica-Beck et al. |
| 2018/0096507 A1 | 4/2018 | Valdivia et al. |
| 2018/0176465 A1 | 6/2018 | Chen et al. |
| 2018/0192094 A1 | 7/2018 | Barnett et al. |
| 2018/0357810 A1 | 12/2018 | Young et al. |
| 2019/0052869 A1 | 2/2019 | Lutter et al. |
| 2019/0052870 A1 | 2/2019 | Lutter et al. |
| 2019/0176333 A1 | 6/2019 | Hager et al. |
| 2019/0265945 A1 | 8/2019 | Newell et al. |

OTHER PUBLICATIONS

KIPO, International Serach Report and Written Opinion for International Patent Application No. PCT/US2014/051136, dated Nov. 11, 2014, 7 pages.

USPTO, Non-final Office Action for U.S. Appl. No. 14/444,938, dated Aug. 17, 2015, 19 pages.

USPTO, Final Office Action for U.S. Appl. No. 14/444,938, dated Dec. 31, 2015, 30 pages.

USPTO, Notice of Allowance for U.S. Appl. No. 14/444,938, dated Jun. 15, 2016, 16 pages.

USPTO, Final Office Action for U.S. Appl. No. 14/842,465, dated Nov. 3, 2017, 85 pages.

USPTO, Non-final Office Action for U.S. Appl. No. 14/842,465, dated Feb. 27, 2017, 65 pages.

Kenji Mase et al., "Socially assisted multi-view video viewer," Proceedings of the 13th International Conference on Multimodal Interfaces, ACM, 2011.11, pp. 319-322.

USPTO, Notice of Allowance for U.S. Appl. No. 14/845,137, dated Apr. 13, 2016, 36 pages.

USPTO, Notice of Allowance for U.S. Appl. No. 15/146,774, dated Jul. 28, 2017, 11 pages.

USPTO, Non-final Office Action for U.S. Appl. No. 14/845,137, dated Dec. 18, 2015, 51 pages.

USPTO, Non-final Office Action for U.S. Appl. No. 14/465,570, dated Apr. 20, 2017, 24 pages.

USPTO, Non-final Office Action for U.S. Appl. No. 15/585,154, dated Jun. 16, 2017, 29 pages.

USPTO, Final Office Action for U.S. Appl. No. 14/465,570, dated Nov. 28, 2017, 33 pages.

USPTO, Final Office Action for U.S. Appl. No. 15/585,154, dated Dec. 26, 2017, 50 pages.

USPTO, Non-final Office Action for U.S. Appl. No. 15/585,154, dated Jun. 14, 2018, 32 pages.

USPTO, Final Office Action for U.S. Appl. No. 14/841,452, dated Jun. 14, 2018, 22 pages.

USPTO, Notice of Allowance for U.S. Appl. No. 14/841,452, dated Sep. 12, 2018, 5 pages.

USPTO, Non-final Office Action for U.S. Appl. No. 15/910,932, dated May 10, 2018 28 pages.

(56) References Cited

OTHER PUBLICATIONS

USPTO, Notice of Allowance for U.S. Appl. No. 15/910,932, dated Oct. 3, 2018, 12 pages.
USPTO, Non-final Office Action for U.S. Appl. No. 14/465,570, dated Jul. 2, 2018, 18 pages.
USPTO, Final Office Action for U.S. Appl. No. 15/243,122, dated Jan. 11, 2019, 39 pages.
USPTO, Non-final Office Action for U.S. Appl. No. 14/842,465, dated Feb. 7, 2019, 32 pages.
USPTO, Non-final Office Action for U.S. Appl. No. 15/803,599, dated Feb. 21, 2019, 24 pages.
USPTO, Non-final Office Action for U.S. Appl. No. 15/243,122, dated May 9, 2018, 19 pages.

* cited by examiner

GENERATING CONTENT FOR A VIRTUAL REALITY SYSTEM

CROSS-REFERENCE TO RELATED APPLICATIONS

This application is a divisional of U.S. patent application Ser. No. 14/465,570, filed Aug. 21, 2014, which claims the benefit of U.S. provisional application No. 61/868,527, filed Aug. 21, 2013, U.S. provisional application No. 62/004,645, filed May 29, 2014, U.S. provisional application No. 62/008,215, filed Jun. 5, 2014, and U.S. provisional application No. 62/029,254, filed Jul. 25, 2014. The foregoing applications are incorporated herein by reference.

FIELD

The embodiments discussed herein are related to a virtual presence system and method. More particularly, the embodiments discussed herein relate to generating content for a virtual reality (VR) system.

BACKGROUND

As technology improves, people become more isolated from human-to-human interaction. Instead of interacting with people in the physical world, people become more interested in the changes occurring on their phones and other mobile devices. This can result in loneliness and a sense of being disconnected.

One way to reduce the feelings of isolation comes from using virtual reality systems. In a virtual reality system, users interact with visual displays generated by software to experience a new location, activity, etc. For example, the user may play a game and interact with other characters in the game. In another example, the government is currently using virtual reality systems to train pilots. Current systems, however, fail to completely remedy feelings of isolation because the VR systems are insufficiently realistic.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one innovative aspect of the subject matter described in this disclosure, a system includes one or more processors and one or more non-transitory tangible computer-readable mediums communicatively coupled to the one or more processors and storing executable instructions executable by the one or more processors to perform operations including: generating virtual reality content that includes a compressed stream of three-dimensional video data and a stream of three-dimensional audio data with a processor-based computing device programmed to perform the generating, providing the virtual reality content to a user, detecting a location of the user's gaze at the virtual reality content, and suggesting a first advertisement based on the location of the user's gaze.

Other aspects include corresponding methods, systems, apparatus, and computer program products for these and other innovative aspects.

These and other embodiments may each optionally include one or more of the following operations and features. For instance, the operations include: determining a cost for displaying advertisements based on the location of the user's gaze, the cost being based on a length of time that the user gazes at the location; providing a graphical object as part of the virtual reality content that is linked to a second advertisement; generating graphics for displaying a bottom portion and a top portion that include at least some of the virtual reality content and providing an advertisement that is part of at least the bottom portion or the top portion.

According to another innovative aspect of the subject matter described in this disclosure, a system includes one or more processors and one or more non-transitory tangible computer-readable mediums communicatively coupled to the one or more processors and storing executable instructions executable by the one or more processors to perform operations including: receiving virtual reality content that includes a stream of three-dimensional video data and a stream of three-dimensional audio data to a first user with a processor-based computing device programmed to perform the receiving, generating a social network for the first user, and generating a social graph that includes user interactions with the virtual reality content.

These and other embodiments may each optionally include one or more of the following operations and features. For instance, the operations include: suggesting a connection between the first user and a second user based on the virtual reality content; suggesting a group associated with the social network based on the virtual reality content; comprising automatically generating social network updates based on the first user interacting with the virtual reality content; determining subject matter associated with the virtual reality content, determining other users that are interested in the subject matter, and wherein the other users receive the social network updates based on the first user interacting with the virtual reality content; generating privacy settings for the first user for determining whether to publish social network updates based on a type of activity; and storing information in a social graph about the first user's gaze at advertisements displayed as part of the virtual reality content.

The features may optionally include determining other users that are interested in the subject matter based on the other users expressly indicting that they are interested in the subject matter.

According to another innovative aspect of the subject matter described in this disclosure, a system includes one or more processors and one or more non-transitory tangible computer-readable mediums communicatively coupled to the one or more processors and storing executable instructions executable by the one or more processors to perform operations including: providing virtual reality content that includes a compressed stream of three-dimensional video data and a stream of three-dimensional audio data with a processor-based computing device programmed to perform the providing, determining locations of user gaze of the virtual reality content, and generating a heat map that includes different colors based on a number of user gazes for each location.

These and other embodiments may each optionally include one or more of the following operations and features. For instance, the operations include: generating a playlist of virtual reality experiences. The features may include the playlist being based on most user views of virtual reality content, a geographical location, or the playlist is generated by a user that is an expert in subject matter and the playlist is based on the subject matter.

The object and advantages of the embodiments will be realized and achieved at least by the elements, features, and combinations particularly pointed out in the claims.

It is to be understood that both the foregoing general description and the following detailed description are exemplary and explanatory and are not restrictive of the disclosure, as claimed.

BRIEF DESCRIPTION OF THE DRAWINGS

Example embodiments will be described and explained with additional specificity and detail through the use of the accompanying drawings in which.

Figure 1:
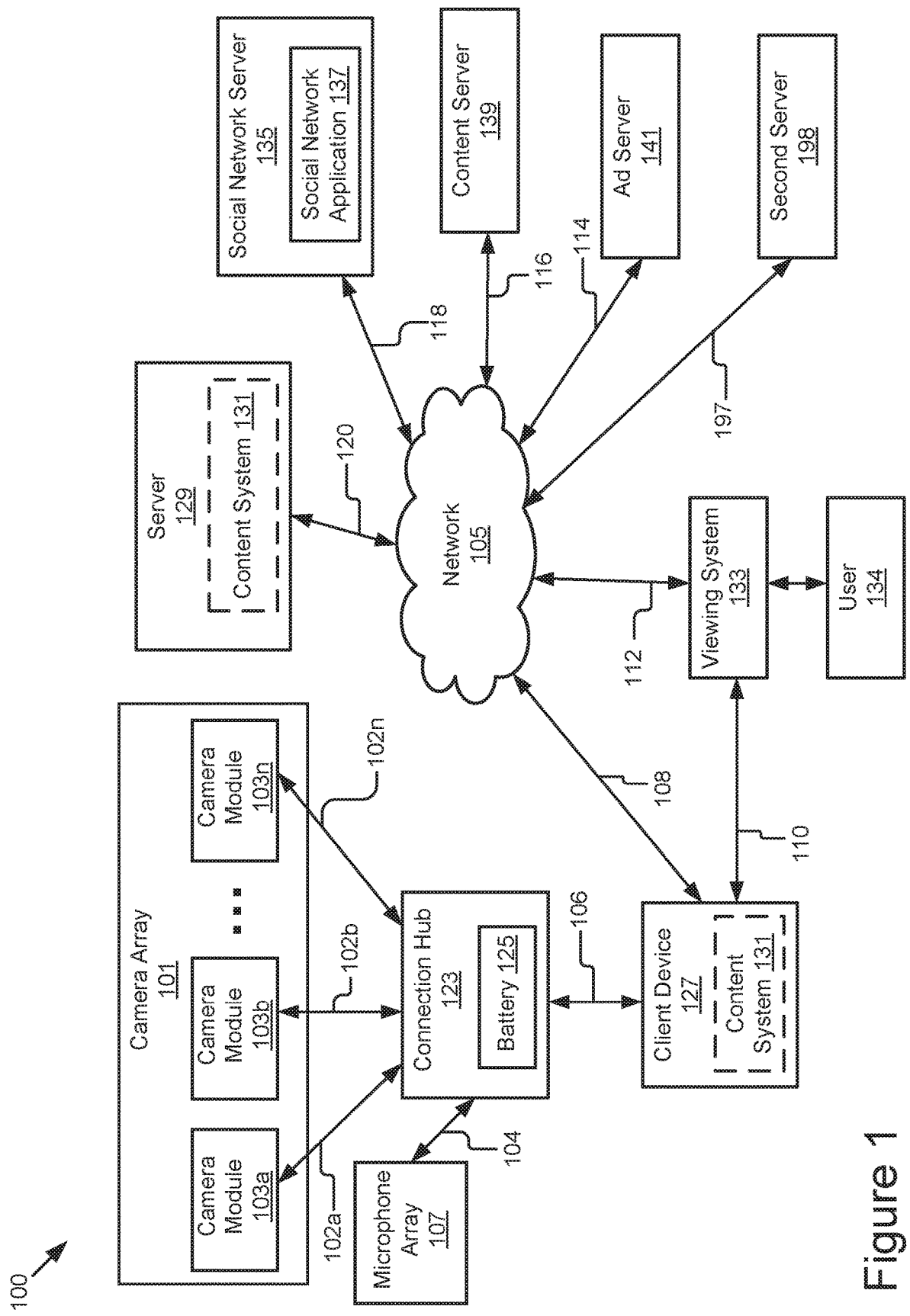
FIG. 1 illustrates a block diagram of some embodiments of an example system for generating content for a virtual reality system.

DETAILED DESCRIPTION OF SOME
EXAMPLE EMBODIMENTS

Example Use Case

A virtual reality experience may include one that creates a realistic sense of being in another place. Creating such an experience may involve reproducing three-dimensional ("3-D") video and optionally 3-D audio for a scene. For example, imagine a user is standing in a forest with a canopy of tree limbs overhead. The user may see trees, rocks, and other objects in various directions. As the user rotates his or her head from side to side and/or up and down, disparity (e.g., shifts in position) of the objects provides the user with depth perception, e.g., the ability to generally perceive the distance to an object in the field of view and/or the distance between objects in the field of view. The user may sense that there is a creek or river behind him or her because the user may hear running water. As the user tilts his or her head to the side, the user's view of the creek or river changes and the sound of the water changes. The creek or river may be easier to see and/or the sound of the water may become more distinct and clearer, and the user has a better sense of how far the water is from the user and how fast the water is flowing. In the canopy of tree limbs above the user, a bird is singing. When the user tilts his or her head upward, the user's senses detect changes in the surrounding environment: the user may see the canopy; the user may see a bluebird singing; the user may have a sense of how far away the bird is based on disparity; and the user may hear the bird's singing more distinctly and loudly since the user is now facing the bird. The user tilts his or her head back to a forward-facing position and now the user may be facing a deer that is standing just 10 feet away from the user. The deer starts to run toward the user and the user's depth perception indicates that the deer is getting closer to the user. Based on the user's depth perception and the relative position of objects around the deer, the user may tell that the deer is running toward him or her at a fast pace.

In some embodiments, a system described herein may include a camera array, a microphone array, a content system, a viewing system, and other devices, systems, or servers. The system is applicable for recording and presenting any event including, but not limited to, a concert, a sports game, a wedding, a press conference, a movie, a promotion event, a video conference, or other event or scene that may be recorded by the camera array and the microphone array. The recording of the event or scene may be viewed through a virtual reality display (e.g., a pair of virtual reality goggles) during occurrence of the event or thereafter.

Camera modules included in the camera array may have lenses mounted around a spherical housing and oriented in different directions with a sufficient diameter and field of view, so that sufficient view disparity may be captured by the camera array for rendering stereoscopic images. In some embodiments, one of the camera modules is a master camera module that dictates the start and stop of recording of video data. The camera array may output raw video data describing image frames with different viewing directions to the content system.

The microphone array is capable of capturing sounds from various directions. The microphone array may output the captured sounds and related directionalities to the content system, which allows the content system to reconstruct sounds from any arbitrary direction.

The content system may aggregate raw video data outputted from the camera array and raw audio data outputted from the microphone array for processing and storage. In some embodiments, the content system may include a set of Gigabit Ethernet switches for collecting the raw video data and an audio interface for collecting the raw audio data. Both of the raw video data and audio data may be fed into a client device or a server with a storage device for storing the raw video data and audio data.

The content system may include code and routines stored on a non-transitory memory for processing the raw video data and audio data received across multiple recording devices and for converting the raw video data and audio data into a single compressed stream of 3D video and audio data. For example, the content system may include code and routines that, when executed by a processor, stitch the image frames from multiple camera modules into two panoramic 3D video streams for left and right eye viewing, such as a stream of left panoramic images for left eye viewing (also referred to as a left stream of panoramic images) and a stream of right panoramic images for right eye viewing (also referred to as a right stream of panoramic images). The streams of left and right panoramic images are configured to create a time-varying panorama viewed by a user using the viewing system.

In some embodiments, the content system may construct a stereoscopic panorama using image frames from multiple views each in a different direction. For example, the camera array includes multiple camera modules arranged around all 360 degrees of a sphere. The camera modules each have a lens pointing in a different direction. Because the camera modules are arranged around 360 degrees of a sphere and taking images of the scene from multiple viewpoints, the images captured by the camera modules at a particular time include multiple views of the scene from different directions. The resulting left or right panoramic image for the particular time includes a spherical representation of the scene at the particular time. Each pixel in the left or right panoramic image may represent a view of the scene in a slightly different direction relative to neighboring pixels.

In some embodiments, the content system generates, based on a left camera map, the stream of left panoramic images for left eye viewing from image frames captured by the camera array. The left camera map identifies a corresponding matching camera module for each pixel in a left panoramic image. A pixel in a panoramic image may correspond to a point in a panoramic scene, and a matching camera module for the pixel in the panoramic image may be a camera module that has a lens with a better view for the point than other camera modules. The left camera map may map pixels in a left panoramic image to corresponding matching camera modules. Similarly, the content system generates, based on a right camera map, the stream of right panoramic images for right eye viewing from image frames captured by the camera array. The right camera map identifies a corresponding matching camera module for each pixel in a right panoramic image. The right camera map may map pixels in a right panoramic image to corresponding matching camera modules.

The content system may also include code and routines that, when executed by a processor, correct camera calibration errors, exposure or color deficiencies, stitching artifacts, and other errors on the left and right panoramic images.

The content system may also add four-channel ambisonic audio tracks to the 3D video streams, and may encode and compress the 3D video and audio streams using a standard moving picture experts group (MPEG) format or other suitable encoding/compression format.

In some embodiments, the content system includes code and routines configured to filter the 3D video data to improve its quality. The content system may also include code and routines for intentionally changing the appearance of the video with a video effect. In some embodiments, the content system includes code and routines configured to determine an area of interest in a video for a user and to enhance the audio corresponding to the area of interest in the video.

The viewing system decodes and renders the 3D video and audio streams received from the content system on a virtual reality display device (e.g., a virtual reality display) and audio reproduction devices (e.g., headphones or other suitable speakers). The virtual reality display device may display left and right panoramic images for the user to provide a 3D immersive viewing experience. The viewing system may include the virtual reality display device that tracks the movement of a user's head. The viewing system may also include code and routines for processing and adjusting the 3D video data and audio data based on the user's head movement to present the user with a 3D immersive viewing experience, which allows the user to view the event or scene in any direction. Optionally, 3D audio may also be provided to augment the 3D viewing experience.

Once the virtual reality content is generated, there are many applications for the virtual reality content. In one embodiment, the content system generates advertisements within the virtual reality. For example, the advertisements are displayed in areas that are unobtrusive, such as above the user or below the user. The virtual reality system may be able to determine how to charge for the advertisements based on a location of the user's gaze. In another embodiment, the content system communicates with a social network application to identify users for using the virtual reality content together, for generating virtual reality updates for the user's friends on the social network, for suggesting content to the user based on the user's interest in certain virtual reality subject matter, etc. In yet another embodiment, the virtual reality system determines overall usage information such as a heat map of user gazes and a playlist of virtual reality experiences.

Embodiments of the disclosure will be explained with reference to the accompanying drawings.

Example System

FIG. 1 illustrates a block diagram of some embodiments of an example system 100 that collects and aggregates image frames and audio data to generate virtual reality content, arranged in accordance with at least some embodiments described herein. The illustrated system 100 includes a camera array 101, a connection hub 123, a microphone array 107, a client device 127, and a viewing system 133. In some embodiments, the system 100 additionally includes a server 129, a social network server 135, a content server 139, an advertisement (ad) server 141, and a second server 198. The client device 127, the viewing system 133, the server 129, the social network server 135, the content server 139, the second server 198, and the ad server 141 may be communicatively coupled via a network 105.

The separation of various components and servers in the embodiments described herein should not be understood as requiring such separation in all embodiments, and it should be understood that the described components and servers may generally be integrated together in a single component or server. Additions, modifications, or omissions may be made to the illustrated embodiment without departing from the scope of the present disclosure, as will be appreciated in view of the disclosure.

While FIG. 1 illustrates one camera array 101, one connection hub 123, one microphone array 107, one client device 127, one server 129, one social network server 135, one content server 139, one ad server 141, one second server 198, and one viewing system 133, the disclosure applies to a system architecture having one or more camera arrays 101, one or more connection hubs 123, one or more microphone arrays 107, one or more client devices 127, one or more servers 129, one or more social network servers 135, one or more content servers 139, one or more ad servers 141, one or more second servers 198, and one or more viewing systems 133. Furthermore, although FIG. 1 illustrates one network 105 coupled to the entities of the system 100, in practice one or more networks 105 may be connected to these entities and the one or more networks 105 may be of various and different types.

The camera array 101 may be a modular camera system configured to capture raw video data that includes image frames. In the illustrated embodiment shown in FIG. 1, the camera array 101 includes camera modules 103a, 103b . . . 103n (also referred to individually and collectively herein as camera module 103). While three camera modules 103a, 103b, 103n are illustrated in FIG. 1, the camera array 101 may include any number of camera modules 103. The camera array 101 may be constructed using individual cameras with each camera module 103 including one individual camera. In some embodiments, the camera array 101 may also include various sensors including, but not limited to, a depth sensor, a motion sensor (e.g., a global positioning system (GPS), an accelerometer, a gyroscope, etc.), a sensor for sensing a position of the camera array 101, and other types of sensors.

The camera array 101 may be constructed using various configurations. For example, the camera modules 103a, 103b . . . 103n in the camera array 101 may be configured in different geometries (e.g., a sphere, a line, a cylinder, a cone, a cube, etc.) with the corresponding lenses 113 facing in different directions. For example, the camera modules 103 are positioned within the camera array 101 in a honeycomb pattern where each of the compartments form an aperture where a camera module 103 may be inserted. In another example, the camera array 101 includes multiple lenses along a horizontal axis and a smaller number of lenses on a vertical axis.

In some embodiments, the camera modules 103a, 103b . . . 103n in the camera array 101 are oriented around a sphere in different directions with sufficient diameter and field-of-view to capture enough view disparity to render stereoscopic images. For example, the camera array 101 may comprise HERO3+ GoPro® cameras that are distributed around a sphere. In another example, the camera array 101 may comprise 32 Point Grey Blackfly Gigabit Ethernet cameras distributed around a 20 centimeter diameter sphere. Camera models that are different from the HERO3+ or the Point Grey Blackfly camera model may be included in the camera array 101. For example, in some embodiments the camera array 101 comprises a sphere whose exterior surface is covered in one or more optical sensors configured to render 3D images or video. The optical sensors may be communicatively coupled to a controller. The entire exterior surface of the sphere may be covered in optical sensors configured to render 3D images or video.

In some embodiments, the camera modules 103 in the camera array 101 are configured to have a sufficient field-of-view overlap so that all objects can be seen from more than one view point. For example, the horizontal field of view for each camera module 103 included in the camera array 101 is 70 degrees. In some embodiments, having the camera array 101 configured in such a way that an object may be viewed by more than one camera module 103 is beneficial for correcting exposure or color deficiencies in the images captured by the camera array 101.

The camera modules 103 in the camera array 101 may or may not include built-in batteries. The camera modules 103 may obtain power from a battery coupled to the connection hub 123. In some embodiments, the external cases of the camera modules 103 may be made of heat-transferring materials such as metal so that the heat in the camera modules 103 may be dissipated more quickly than using other materials. In some embodiments, each camera module 103 may include a heat dissipation element. Examples of heat dissipation elements include, but are not limited to, heat sinks, fans, and heat-dissipating putty.

Each of the camera modules 103 may include one or more processors, one or more memory devices (e.g., a secure digital (SD) memory card, a secure digital high capacity (SDHC) memory card, a secure digital extra capacity (SDXC) memory card, and a compact flash (CF) memory card, etc.), an optical sensor (e.g., semiconductor charge-coupled devices (CCD), active pixel sensors in complementary metal-oxide-semiconductor (CMOS), and N-type metal-oxide-semiconductor (NMOS, Live MOS), etc.), a depth sensor (e.g., PrimeSense depth sensor), a lens (e.g., a camera lens), and other suitable components.

In some embodiments, the camera modules 103a, 103b . . . 103n in the camera array 101 may form a daisy chain in which the camera modules 103a, 103b . . . 103n are connected in sequence. The camera modules 103a, 103b . . . 103n in the camera array 101 may be synchronized through the daisy chain. One camera module (e.g., the camera module 103a) in the daisy chain may be configured as a master camera module that controls clock signals for other camera modules in the camera array 101. The clock signals may be used to synchronize operations (e.g., start operations, stop operations) of the camera modules 103 in the camera array 101. Through the synchronized start and stop operations of the camera modules 103, the image frames in the respective video data captured by the respective camera modules 103a, 103b . . . 103n are also synchronized.

Example embodiments of the camera array 101 and the camera modules 103 are described in U.S. application Ser. No. 14/444,938, titled "Camera Array Including Camera Modules," filed Jul. 28, 2014, which is herein incorporated in its entirety by reference.

The camera modules 103 may be coupled to the connection hub 123. For example, the camera module 103a is communicatively coupled to the connection hub 123 via a signal line 102a, the camera module 103b is communicatively coupled to the connection hub 123 via a signal line 102b, and the camera module 103n is communicatively coupled to the connection hub 123 via a signal line 102n. In some embodiments, a signal line in the disclosure may represent a wired connection or any combination of wired connections such as connections using Ethernet cables, high-definition multimedia interface (HDMI) cables, universal serial bus (USB) cables, RCA cables, Firewire, Camera-Link, or any other signal line suitable for transmitting video data and audio data. Alternatively, a signal line in the disclosure may represent a wireless connection such as a wireless fidelity (Wi-Fi) connection or a BLUETOOTH® connection.

The microphone array 107 may include one or more microphones configured to capture sounds from different directions in an environment. In some embodiments, the microphone array 107 may include one or more processors and one or more memories. The microphone array 107 may include a heat dissipation element. In the illustrated embodiment, the microphone array 107 is coupled to the connection hub 123 via a signal line 104. Alternatively or additionally, the microphone array 107 may be directly coupled to other entities of the system 100 such as the client device 127.

The microphone array 107 may capture sound from various directions. The sound may be stored as raw audio data on a non-transitory memory communicatively coupled to the microphone array 107. The microphone array 107 may detect directionality of the sound. The directionality of the sound may be encoded and stored as part of the raw audio data.

In some embodiments, the microphone array 107 may include a Core Sound Tetramic soundfield tetrahedral microphone array following the principles of ambisonics, enabling reconstruction of sound from any arbitrary direction. In another example, the microphone array includes the Eigenmike, which advantageously includes a greater number of microphones and, as a result, can perform higher-order (i.e. more spatially accurate) ambisonics. The microphone may be mounted to the top of the camera array 101, be positioned between camera modules 103, or be positioned within the body of the camera array 101.

In some embodiments, the camera modules 103 may be mounted around a camera housing (e.g., a spherical housing, honeycomb housing, or a housing with another suitable shape). The microphone array 107 may include multiple microphones mounted around the same camera housing, with each microphone located in a different position. The camera housing may act as a proxy for the head-shadow sound-blocking properties of a human head. As described below with reference to FIG. 2, during playback of the recorded audio data, an audio module 212 may select an audio track for a user's ear from a microphone that has a closest orientation to the user's ear. Alternatively, the audio track for the user's ear may be interpolated from audio tracks recorded by microphones that are closest to the user's ear.

The connection hub 123 may receive the raw audio data recorded by the microphone array 107 and forward the raw audio data to the client device 127 for processing and storage. The connection hub 123 may also receive and aggregate streams of raw video data describing image frames captured by the respective camera modules 103. The connection hub 123 may then transfer the raw video data to the client device 127 for processing and storage. The connection hub 123 is communicatively coupled to the client device 127 via a signal line 106. In some examples, the connection hub 123 may be a USB hub. In some embodiments, the connection hub 123 includes one or more batteries 125 for supplying power to the camera modules 103 in the camera array 101. Alternatively or additionally, one or more batteries 125 may be coupled to the connection hub 123 for providing power to the camera modules 103.

The client device 127 may be a processor-based computing device. For example, the client device 127 may be a personal computer, laptop, tablet computing device, smartphone, set top box, network-enabled television, or any other processor based computing device. In some embodiments, the client device 127 includes network functionality and is communicatively coupled to the network 105 via a signal line 108. The client device 127 may be configured to transmit data to the server 129 or to receive data from the server 129 via the network 105.

The client device 127 may receive raw video data and raw audio data from the connection hub 123. In some embodiments, the client device 127 may store the raw video data and raw audio data locally in a storage device associated with the client device 127. Alternatively, the client device 127 may send the raw video data and raw audio data to the server 129 via the network 105 and may store the raw video data and the audio data on a storage device associated with the server 129. In some embodiments, the client device 127 includes a content system 131 for aggregating raw video data captured by the camera modules 103 to form 3D video data and aggregating raw audio data captured by the microphone array 107 to form 3D audio data. Alternatively or additionally, the content system 131 may be operable on the server 129.

The content system 131 may include a system configured to aggregate raw video data and raw audio data to generate a stream of 3D video data and a stream of 3D audio data, respectively. The content system 131 may be stored on a single device or a combination of devices of FIG. 1. In some embodiments, the content system 131 can be implemented using hardware including a field-programmable gate array ("FPGA") or an application-specific integrated circuit ("ASIC"). In some other embodiments, the content system 131 may be implemented using a combination of hardware and software. The content system 131 is described below in more detail with reference to FIGS. 2-5.

The viewing system 133 may include or use a computing device to decode and render a stream of 3D video data on a virtual reality display device (e.g., Oculus Rift virtual reality display) or other suitable display devices that include, but are not limited to: augmented reality glasses; televisions; smartphones, tablets, or other devices with 3D displays and/or position tracking sensors; and display devices with a viewing position control, etc. The viewing system 133 may also decode and render a stream of 3D audio data on an audio reproduction device (e.g., a headphone or other suitable speaker devices). The viewing system 133 may include the virtual reality display configured to render the 3D video data and the audio reproduction device configured to render the 3D audio data. The viewing system 133 may be coupled to the client device 127 via a signal line 110 and the network 105 via a signal line 112. A user 134 may interact with the viewing system 133.

In some embodiments, the viewing system 133 may receive virtual reality content from the client device 127. Alternatively or additionally, the viewing system 133 may receive the virtual reality content from the server 129. The viewing system 133 may also be coupled to the content system 131 and may receive the virtual reality content from the content system 131. The virtual reality content may include one or more of a stream of 3D video data, a stream of 3D audio data, a compressed stream of 3D video data, a compressed stream of 3D audio data, and other suitable content.

The viewing system 133 may track a head orientation of a user. For example, the viewing system 133 may include one or more accelerometers or gyroscopes used to detect a change in the user's head orientation. The viewing system 133 may decode and render the stream of 3D video data on a virtual reality display device and the stream of 3D audio data on a speaker system based on the head orientation of the user. As the user changes his or her head orientation, the viewing system 133 may adjust the rendering of the 3D video data and 3D audio data based on the changes of the user's head orientation.

The viewing system 133 may provide an immersive viewing experience to the user 134. For example, the viewing system 133 may include a virtual reality display device that has a wide field of view so that the user 134 viewing the virtual reality content feels like he or she is surrounded by the virtual reality content in a manner similar to in a real-life environment. A complete 360-degree view of the scene is provided to the user 134, and the user 134 may view the scene in any direction. As the user 134 moves his or her head, the view is modified to match what the user 134 would see as if he or she was moving his or her head in the real world. By providing a different view to each eye (e.g., a stream of left panoramic images for left eye viewing and a stream of right panoramic images for right eye viewing), which simulates what the left and right eyes may see in the real world, the viewing system 133 may give the user 134 a 3D view of the scene. Additionally, 3D surrounding sound may be provided to the user 134 based on the user's head orientation to augment the immersive 3D viewing experience. For example, if a character in an immersive movie is currently behind the user 134, the character's voice may appear to be emanating from behind the user 134.

In some embodiments, the viewing system 133 may allow the user 134 to adjust the left panoramic images and the right panoramic images to conform to the user's interpupillary distance. The left panoramic images and the right panoramic images may move further apart for users with larger interpupillary distances or may move closer for users with smaller interpupillary distances.

In some embodiments, the viewing system 133 includes a peripheral device such as a microphone, camera, mouse, or keyboard that is configured to enable the user 134 to provide an input to one or more components of the system 100. For example, the user 134 may interact with the peripheral device to provide a status update to the social network service provided by the social network server 135. In some embodiments, the peripheral device includes a motion sensor such as the Microsoft® Kinect or another similar device, which allows the user 134 to provide gesture inputs to the viewing system 133 or other entities of the system 100.

In some embodiments, the viewing system 133 includes peripheral devices for making physical contact with the user to make the virtual reality experience more realistic. The viewing system 133 may include gloves for providing the user 134 with tactile sensations that correspond to virtual reality content. For example, the virtual reality content may include images of another user and when the user 134 reaches out to touch the other user the viewing system 133 provides pressure and vibrations that make it feel like the user 134 is making physical contact with the other user. In some embodiments, the viewing system 133 may include peripheral devices for other parts of the body.

In some embodiments, multiple viewing systems 133 may receive and consume the virtual reality content streamed by the content system 131. In other words, two or more viewing systems 133 may be communicatively coupled to the content system 131 and configured to simultaneously or contemporaneously receive and consume the virtual reality content generated by the content system 131.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include BLUETOOTH® communication networks or a cellular communication network for sending and receiving data including via short messaging service (SMS), multimedia messaging service (MMS), hypertext transfer protocol (HTTP), direct data connection, WAP, e-mail, etc.

The server 129 may be a hardware server that includes a processor, a memory, and network communication capabilities. In the illustrated embodiment, the server 129 is coupled to the network 105 via a signal line 120. The server 129 sends and receives data to and from one or more of the other entities of the system 100 via the network 105. For example, the server 129 receives VR content including a stream of 3D video data (or compressed 3D video data) and a stream of 3D audio data (or compressed 3D audio data) from the client device 127 and stores the VR content on a storage device associated with the server 129. Alternatively, the server 129 includes the content system 131 that receives raw video data and raw audio data from the client device 127 and aggregates the raw video data and raw audio data to generate the VR content. The viewing system 133 may access the VR content from the server 129 or the client device 127.

The ad server 141 may be a hardware server that includes a processor, a memory, and network communication capabilities. In the illustrated embodiment, the ad server 141 is coupled to the network 105 via a signal line 114. The ad server 141 sends and receives data to and from one or more of the other entities of the system 100 via the network 105. In some embodiments, the ad server 141 is an advertisement repository for advertisements that are requested by the content system 131 for display as part of the virtual reality content.

In some embodiments, the ad server 141 includes rules for targeting advertisements to specific users, for targeting advertisements to be displayed in conjunction with various types of content (e.g., content served by the content server 139, virtual reality content served by the client device 127 or the server 129), for targeting advertisements to specific locations or Internet Protocol (IP) addresses associated with the client device 127, the viewing system 133, or the user 134. The ad server 141 may include other rules for selecting and/or targeting advertisements.

In some embodiments, the ad server 141 receives metadata associated with virtual reality content displayed by the viewing system 133 and selects advertisements for presentation in conjunction with the virtual reality content based on the metadata. For example, the ad server 141 selects stored advertisements based on keywords associated with the virtual reality content. Other methods are possible for providing targeted advertisements to users, which may alternatively or additionally be implemented in the embodiments described herein.

The content server 139 may be a hardware server that includes a processor, a memory, and network communication capabilities. In the illustrated embodiment, the content server 139 is coupled to the network 105 via a signal line 116. The content server 139 sends and receives data to and from one or more of the other entities of the system 100 via the network 105. The content provided by the content server 139 may include any content that is configured to be rendered as 3D video data and/or 3D audio data. In some embodiments, the content provided by the content server 139 may be videos of events such as sporting events, weddings, press conferences or other events, movies, television shows, music videos, interactive maps such as Google® Street View maps, and any other virtual reality content. In some embodiments, the content includes a video game. In other embodiments, the content includes a picture such as a family photo that has been configured to be experienced as virtual reality content.

In some embodiments, the content server 139 provides content responsive to a request from the content system 131, the client device 127, or the viewing system 133. For example, the content server 139 is searchable using keywords. The client device 127, the viewing system 133, or the content system 131 provides a keyword search to the content server 139 and selects content to be viewed on the viewing system 133. In some embodiments, the content server 139 enables a user to browse content associated with the content server 139. For example, the content includes a virtual store including items for purchase and the user may navigate the store in 3D. In some embodiments, the content server 139 may provide the user with content recommendations. For example, the content server 139 recommends items for purchase inside the 3D store.

The second server 198 may be a hardware server that includes a processor, a memory, and network communication capabilities. In the illustrated embodiment, the second server 198 is coupled to the network 105 via a signal line 197. The second server 198 sends and receives data to and from one or more of the other entities of the system 100 via the network 105. The second server 198 may provide computer-generated imagery to the content system 131 for insertion into the stream so that live and computer-generated images may be combined. In other embodiments, the second server 198 provides audio tracks that may be provided to the content system 131 for insertion into the stream so that live content includes an audio track. For example, the audio track is a soundtrack.

In some embodiments, the second server 198 includes functionality to modify the video or audio provided to the content system 131. For example, the second server 198 includes code and routines executed by a processor and configured to provide noise cancellation of audio, reverberation effects for audio, insertion of video effects, etc. Accordingly, the second server 198 may be configured to enhance or transform video and audio associated with the content system 131.

The social network server 135 may be a hardware server that includes a processor, a memory, and network communication capabilities. In the illustrated embodiment, the social network server 135 is coupled to the network 105 via a signal line 118. The social network server 135 sends and receives data to and from one or more of the other entities of the system 100 via the network 105. The social network server 135 includes a social network application 137. A social network may be a type of social structure where the users may be connected by a common feature. The common feature includes relationships/connections, e.g., friendship, family, work, an interest, etc. Common features do not have to be explicit. For example, the common feature may include users who are watching the same live event (e.g., football game, concert, etc.), playing the same video game, etc. In some embodiments, the users are watching the event using the functionality provided by the content system 131 and the viewing systems 133. The common features may be provided by one or more social networking systems including explicitly defined relationships and relationships implied by social connections with other online users, where the relationships form a social graph. In some examples, the social graph may reflect a mapping of these users and how they may be related.

Although only one social network server 135 with one social network application 137 is illustrated, there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus. In another embodiment, the social network application 137 may be part of the content system 131.

In some embodiments, the social network includes a service that provides a social feed describing one or more social activities of a user. For example, the social feed includes one or more status updates for the user describing the user's actions, expressed thoughts, expressed opinions, etc. In some embodiments, the service provided by the social network application 137 is referred to as a "social network service." Other embodiments may be possible.

In some embodiments, the social network server 135 communicates with one or more of the camera array 101, the microphone array 107, the content system 131, the server 129, the viewing system 133, and the client device 127 to incorporate data from a social graph of a user in a virtual reality experience for the user.

In some embodiments, the system 100 includes two or more camera arrays 101 and two or more microphone arrays 107, and a user may switch between two or more viewpoints of the two or more camera arrays 101. For example, the system 100 may be used to record a live event such as a baseball game. The user may use the viewing system 133 to watch the baseball game from a first view point associated with a first camera array 101. A play is developing on the field and the user may want to switch viewpoints to have a better vantage of the play. The user provides an input to the content system 131 via the viewing system 133, and the content system 131 may switch to a second camera array 101 which provides a better vantage of the play. The second camera array 101 may be associated with a different microphone array 107 which provides different sound to the user specific to the user's new vantage point.

Figure 2:
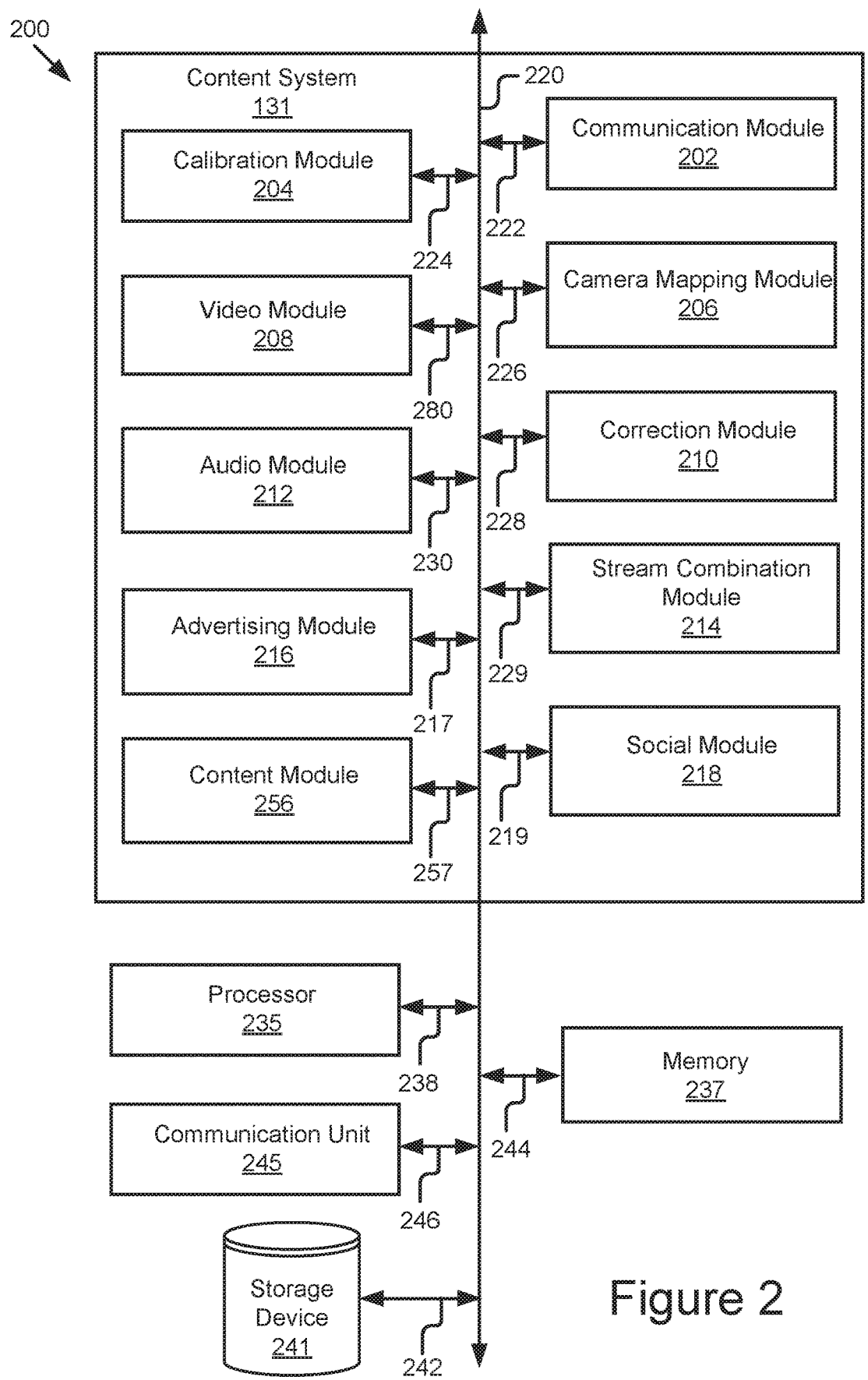
FIG. 2 illustrates a block diagram of some embodiments of a computing device that includes an example content system.

Referring now to FIG. 2, an example of the content system 131 is illustrated in accordance with at least some embodiments described herein. FIG. 2 is a block diagram of a computing device 200 that includes the content system 131, a memory 237, a processor 235, a storage device 241, and a communication unit 245. In the illustrated embodiment, the components of the computing device 200 are communicatively coupled by a bus 220. In some embodiments, the computing device 200 may be a personal computer, smartphone, tablet computer, set top box, or any other processor-based computing device. The computing device 200 may be one of the client device 127, the server 129, and another device in the system 100 of FIG. 1.

The processor 235 may include an arithmetic logic unit, a microprocessor, a general-purpose controller, or some other processor array to perform computations and provide electronic display signals to a display device. The processor 235 is coupled to the bus 220 for communication with the other components via a signal line 238. The processor 235 may process data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors may be included. Other processors, operating systems, sensors, displays, and physical configurations may be possible.

The memory 237 includes a non-transitory memory that stores data for providing the functionality described herein. The memory 237 may be a dynamic random access memory (DRAM) device, a static random access memory (SRAM) device, flash memory, or some other memory devices. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 237 may store the code, routines, and data for the content system 131 to provide its functionality. The memory 237 is coupled to the bus 220 via a signal line 244.

The communication unit 245 may transmit data to any of the entities of the system 100 depicted in FIG. 1. Similarly, the communication unit 245 may receive data from any of the entities of the system 100 depicted in FIG. 1. The communication unit 245 may include one or more Ethernet switches for receiving the raw video data and the raw audio data from the connection hub 123. The communication unit 245 is coupled to the bus 220 via a signal line 246. In some embodiments, the communication unit 245 includes a port for direct physical connection to a network, such as the network 105 of FIG. 1, or to another communication channel. For example, the communication unit 245 may include a port such as a USB, SD, RJ45, or similar port for wired communication with another computing device. In some embodiments, the communication unit 245 includes a wireless transceiver for exchanging data with another computing device or other communication channels using one or more wireless communication methods, including IEEE 802.11, IEEE 802.16, BLUETOOTH®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to a network for distribution of data using standard network protocols including TCP/IP, HTTP, HTTPS, and SMTP, etc.

The storage device 241 may be a non-transitory storage medium that stores data for providing the functionality described herein. The storage device 241 may be a dynamic random access memory (DRAM) device, a static random access memory (SRAM) device, flash memory, or some other memory devices. In some embodiments, the storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 241 is communicatively coupled to the bus 220 via a signal line 242.

In the embodiment illustrated in FIG. 2, the content system 131 includes a communication module 202, a calibration module 204, a camera mapping module 206, a video module 208, a correction module 210, the audio module 212, a stream combination module 214, an advertising module 216, a social module 218, and a content module 256. These modules of the content system 131 are communicatively coupled to each other via the bus 220.

In some embodiments, each module of the content system 131 (e.g., modules 202, 204, 206, 208, 210, 212, 214, 216, 218, or 256) may include a respective set of instructions executable by the processor 235 to provide its respective functionality described below. In some embodiments, each module of the content system 131 may be stored in the memory 237 of the computing device 200 and may be accessible and executable by the processor 235. Each module of the content system 131 may be adapted for cooperation and communication with the processor 235 and other components of the computing device 200.

The communication module 202 may be software including routines for handling communications between the content system 131 and other components of the computing device 200. The communication module 202 may be communicatively coupled to the bus 220 via a signal line 222. The communication module 202 sends and receives data, via the communication unit 245, to and from one or more of the entities of the system 100 depicted in FIG. 1. For example, the communication module 202 may receive raw video data from the connection hub 123 via the communication unit 245 and may forward the raw video data to the video module 208. In another example, the communication module 202 may receive virtual reality content from the stream combination module 214 and may send the virtual reality content to the viewing system 133 via the communication unit 245.

In some embodiments, the communication module 202 receives data from components of the content system 131 and stores the data in the memory 237 or the storage device 241. For example, the communication module 202 receives virtual reality content from the stream combination module 214 and stores the virtual reality content in the memory 237 or the storage device 241. In some embodiments, the communication module 202 retrieves data from the memory 237 or the storage device 241 and sends the data to one or more appropriate components of the content system 131. Alternatively or additionally, the communication module 202 may also handle communications between components of the content system 131.

The calibration module 204 may be software including routines for calibrating the camera modules 103 in the camera array 101. The calibration module 204 may be adapted for cooperation and communication with the processor 235 and other components of the computing device 200 via a signal line 224.

In some embodiments, lenses included in the camera modules 103 may have some amount of spherical distortion. Images captured with the camera modules 103 may have a barrel distortion or a pin-cushion distortion that needs to be corrected during creation of panoramic images from the distorted images. The barrel distortion may be referred to as a "fish eye effect." For each camera module 103, the calibration module 204 calibrates a lens in the corresponding camera module 103 to determine associated distortion caused by the lens. For example, a snapshot of a test pattern that has known geometries placed in a known location (e.g., a checkerboard in a known location) may be captured by the camera module 103. The calibration module 204 may determine properties of a lens included in the camera module 103 from the snapshot of the test pattern. Properties of a lens may include, but are not limited to, distortion parameters, an optical center, and other optical properties associated with the lens.

The calibration module 204 stores data describing the properties of each lens in a configuration file. The configuration file may include data describing properties of all lenses of all the camera modules 103 in the camera array 101. For example, the configuration file includes data describing distortion parameters, an optical center, and other optical properties for each lens in the camera array 101.

Alternatively or additionally, the calibration module 204 may perform multi-camera geometric calibration on the camera array 101 to determine variations in the physical properties of the camera array 101. For example, the calibration module 204 may determine slight variations in camera orientation for each lens in the camera array 101, where the slight variations in the camera orientation may be caused by human errors occurring during an installation or manufacture process of the camera array 101. In another example, the calibration module 204 may estimate errors in the predicted roll, pitch, and yaw of a corresponding lens in each camera module 103. The calibration module 204 may determine a position and a rotational offset for the corresponding lens in each camera module 103 and may store the position and the rotational offset for the corresponding lens in the configuration file. As a result, the relative position of each two lenses in the camera array 101 may be determined based on the positions and rotational offsets of the two corresponding lenses. For example, spatial transformation between each two lenses may be determined based on the positions and rotational offsets of the two corresponding lenses.

The camera mapping module 206 may be software including routines for constructing a left camera map and a right camera map. The camera mapping module 206 may be adapted for cooperation and communication with the processor 235 and other components of the computing device 200 via a signal line 226.

A two-dimensional (2D) spherical panoramic image may be used to represent a panorama of an entire scene. As described below with reference to the video module 208, two stereoscopic panorama images may be generated for two eyes to provide a stereoscopic view of the entire scene. For example, a left panoramic image may be generated for the left eye viewing and a right panoramic image may be generated for the right eye viewing.

A pixel in a panoramic image may be presented by a yaw value and a pitch value. Yaw represents rotation around the center and may be represented on the horizontal x-axis as:

$$yaw=360°\times x/width. \quad (1)$$

Yaw has a value between 0° and 360°. Pitch represents up or down rotation and may be represented on the vertical y-axis as:

$$pitch=90°\times(height/2-y)/(height/2). \quad (2)$$

Pitch has a value between −90° and 90°.

The panoramic images may give a sense of real depth by exploiting a human brain's capacity to transform disparity (e.g., shifts in pixel positions) into depth. For example, a nearby object may have a larger disparity than a far-away object. Disparity may represent pixel shifts in positions between two images. Disparity may be caused by an interocular distance which represents a distance between two eyes. Each eye may receive a slightly different image, which creates a sense of depth.

Typical stereoscopic systems (e.g., 3D movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at a position with yaw∈[0°, 360°] and pitch=0° in a left panoramic image may represent an eye viewing position of the left eye as the head is rotated to the position indicated by the yaw value and the pitch value. Similarly, a pixel at the position with yaw∈[0°, 360°] and pitch=0° in a right panoramic image represents an eye viewing position of the right eye as the head is rotated to the position indicated by the yaw value and the pitch value. For pitch=0° (e.g., no up and down rotations), as the head is rotated from yaw=0° to yaw=360°, a blended panorama for eye viewing positions with all 360-degree head rotations in the horizontal axis may be produced.

In some implementations, the blended panorama is effective for head rotations along the horizontal axis (e.g., yaw) but not for the vertical axis (e.g., pitch). As a user tilts his or her head upwards or downwards (e.g., pitch≠0°), the dominant orientation of the user's eyes with respect to points on the sphere may become less well defined compared to pitch=0°. For example, when the user looks directly upward with pitch=90°, the orientation of the user's eyes with respect to the north pole point of the sphere may be completely ambiguous since the user's eyes may view the north pole point of the sphere from any yaw. Stereo vision may not be supported in the upward and downward directions using left/right eye spheres that are supported in the horizontal orientation. As a result, binocularity may be phased out by diminishing the interocular distance with an adjustment function f(pitch). An output of the adjustment function f(pitch) may decline from 1 to 0 as the pitch increases from 0° to 90° or decreases from 0° to −90°. For example, the adjustment function f(pitch) may include cos (pitch). The interocular distance may be adjusted based on the adjustment function f(pitch). For example, the interocular distance associated with the pitch may be adjusted as:

$$\text{interocular distance}=\max(\text{interocular distance})\times f(\text{pitch}), \quad (3)$$

where max(interocular distance) represents the maximum value of the interocular distance (e.g., the interocular distance is at its maximum when pitch=0°). If f(pitch)=cos (pitch), then the interocular distance may be expressed as:

$$\text{interocular distance}=\max(\text{interocular distance})\times\cos(\text{pitch}). \quad (4)$$

In some examples, the maximum value of the interocular distance may be about 60 millimeters. In other examples, the maximum value of the interocular distance may have a value greater than 60 millimeters or less than 60 millimeters.

The camera mapping module 206 may construct a left camera map that identifies a corresponding matching camera module 103 for each pixel in a left panoramic image. For example, for a pixel in a left panoramic image that represents a point in a panorama, the left camera map may identify a matching camera module 103 that has a best view for the point in the panorama compared to other camera modules 103. Thus, the left camera map may map pixels in a left panoramic image to matching camera modules 103 that have best views for the corresponding pixels. Determination of a matching camera module 103 for a pixel is described below in more detail.

A camera map may include a left camera map or a right camera map. A camera map may use (yaw, pitch) as an input and may generate an output of (an identifier of a matching camera module, x,y), indicating a pixel (yaw, pitch) in a panoramic image may be obtained as a pixel (x,y) in an image plane of the identified matching camera module. The camera map may store the output (an identifier of a matching camera module, x,y) in a map entry related to the input (yaw, pitch). Pixels in an image plane of a camera module may be determined by using a camera model (e.g., a pinhole camera model or more complex lens model) to map points in 3D space onto pixels in the image plane of the camera module, where the points in the 3D space are assumed to be at a particular distance from the camera module. The distance may be set at a fixed radius or varied as a function of pitch and yaw. The distance may be determined by: (1) measuring the scene; (2) manual adjustment by a human operator; (3) using a depth sensor to measure depths of the points in the 3D space; or (4) determining the depths using stereo disparity algorithms.

For each pixel in a left panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the left eye (e.g., a left viewing direction) to the corresponding point in the panorama.

In some embodiments, a matching camera module 103 for a pixel in a left panoramic image that has a better view of the pixel may have a viewing direction to a point in a panorama that corresponds to the pixel in the left panoramic image. The viewing direction of the matching camera module 103 is closer to the left viewing direction than other viewing directions of other camera modules 103 to the same point in the panorama. For example, the viewing direction of the matching camera module 103 is more parallel to the left viewing direction than other viewing directions of other camera modules 103. In other words, for each pixel in the left panoramic image, the left camera map may identify a corresponding matching camera module 103 that has a viewing direction most parallel to the left viewing direction than other viewing directions of other camera modules 103.

Similarly, the camera mapping module 206 may construct a right camera map that identifies a corresponding matching camera module 103 for each pixel in a right panoramic image. For example, for a pixel in a right panoramic image that represents a point in a panorama, the right camera map may identify a matching camera module 103 that has a better view for the point in the panorama than other camera modules 103. Thus, the right camera map may map pixels in a right panoramic image to matching camera modules 103 that have better views for the corresponding pixels.

For each pixel in a right panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the right eye (e.g., a right viewing direction) to the corresponding point in the panorama.

In some embodiments, a matching camera module 103 for a pixel in a right panoramic image that has a better view of the pixel may have a viewing direction to a point in a panorama that corresponds to the pixel in the right panoramic image. The viewing direction of the matching camera module 103 is closer to the right viewing direction than other viewing directions of other camera modules 103 to the same point in the panorama. For example, the viewing direction of the matching camera module 103 is more parallel to the right viewing direction than other viewing directions of other camera modules 103. In other words, for each pixel in the right panoramic image, the right camera map may identify a corresponding matching camera module 103 that has a viewing direction most parallel to the right viewing direction than other viewing directions of other camera modules 103.

Since the physical configuration of the camera array 101 is fixed, the left and right camera maps are the same for different left panoramic images and right panoramic images, respectively. The left and right camera maps may be pre-computed and stored to achieve a faster processing speed compared to an on-the-fly computation.

The video module 208 may be software including routines for generating a stream of 3D video data configured to render 3D video when played back on a virtual reality display device. The video module 208 may be adapted for cooperation and communication with the processor 235 and other components of the computing device 200 via a signal line 280. The stream of 3D video data may describe a stereoscopic panorama of a scene that may vary over time. The stream of 3D video data may include a stream of left panoramic images for left eye viewing and a stream of right panoramic images for right eye viewing.

In some embodiments, the video module 208 receives raw video data describing image frames from the various camera modules 103 in the camera array 101. The video module 208 identifies a location and timing associated with each of the camera modules 103 and synchronizes the image frames based on locations and timings of the camera modules 103. The video module 208 synchronizes image frames captured by different camera modules 103 at the same times.

For example, the video module 208 receives a first stream of image frames from a first camera module 103 and a second stream of image frames from a second camera module 103. The video module 208 identifies that the first camera module 103 is located at a position with yaw=0° and pitch=0° and the second camera module 103 is located at a position with yaw=30° and pitch=0°. The video module 208 synchronizes the first stream of image frames with the second stream of image frames by associating a first image frame from the first stream at a time $T=T_0$ with a second image frame from the second stream at the time $T=T_0$, a third image frame from the first stream at a time $T=T_1$ with a fourth image frame from the second stream at the time $T=T_1$, and so on and so forth.

In some implementations, the video module 208 sends the synchronized image frames to the correction module 210 so that the correction module 210 may correct calibration errors in the synchronized image frames. For example, the correction module 210 may correct lens distortion, orientation errors, and rotation errors, etc., in the image frames. The correction module 210 may send the image frames back to the video module 208 after correcting the calibration errors.

The video module 208 may receive a left camera map and a right camera map from the camera mapping module 206. Alternatively, the video module 208 may retrieve the left and right camera maps from the storage device 241 or the memory 237. The video module 208 may construct a stream of left panoramic images from the image frames based on the left camera map. For example, the video module 208 identifies matching camera modules 103 listed in the left camera map. The video module 208 constructs a first left panoramic image $PI_{L,0}$ for a first time $T=T_0$ by stitching together image frames captured at the first time $T=T_0$ by the matching camera modules 103. The video module 208 constructs a second left panoramic image $PI_{L,1}$ at a second time $T=T_1$ using image frames captured at the second time $T=T_1$ by the matching camera modules 103, and so on and so forth. The video module 208 constructs the stream of left panoramic images to include the first left panoramic image $PI_{L,0}$ at the first time $T=T_0$, the second left panoramic image $PI_{L,1}$ at the second time $T=T_1$, and other left panoramic images at other corresponding times.

Specifically, for a pixel in a left panoramic image $PI_{L,i}$ at a particular time $T=T_i$ (i=0, 1, 2, . . . ), the video module 208: (1) identifies a matching camera module 103 from the left camera map; and (2) configures the pixel in the left panoramic image $PI_{L,i}$ to be a corresponding pixel from an image frame captured by the matching camera module 103 at the same time $T=T_i$. The pixel in the left panoramic image $PI_{L,i}$ and the corresponding pixel in the image frame of the matching camera module 103 may correspond to the same point in the panorama. For example, for a pixel location in the left panoramic image $PI_{L,1}$ that corresponds to a point in the panorama, the video module 208: (1) retrieves a pixel that also corresponds to the same point in the panorama from the image frame captured by the matching camera module 103 at the same time $T=T_i$; and (2) places the pixel from the image frame of the matching camera module 103 into the pixel location of the left panoramic image $PI_{L,i}$.

Similarly, the video module 208 constructs a stream of right panoramic images from the image frames based on the right camera map by performing operations similar to those described above with reference to the construction of the stream of left panoramic images. For example, the video module 208 identifies matching camera modules 103 listed in the right camera map. The video module 208 constructs a first right panoramic image $PI_{R,0}$ for a first time $T=T_0$ by stitching together image frames captured at the first time $T=T_0$ by the matching camera modules 103. The video module 208 constructs a second right panoramic image $PI_{R,1}$ at a second time $T=T_1$ using image frames captured at the second time $T=T_1$ by the matching camera modules 103, and so on and so forth. The video module 208 constructs the stream of right panoramic images to include the first right panoramic image $PI_{R,0}$ at the first time $T=T_0$, the second right panoramic image $PI_{R,1}$ at the second time $T=T_1$, and other right panoramic images at other corresponding times.

Specifically, for a pixel in a right panoramic image $PI_{R,i}$ at a particular time $T=T_i$ (i=0, 1, 2, ...), the video module 208: (1) identifies a matching camera module 103 from the right camera map; and (2) configures the pixel in the right panoramic image $PI_{R,i}$ to be a corresponding pixel from an image frame captured by the matching camera module 103 at the same time $T=T_i$. The pixel in the right panoramic image $PI_{R,i}$ and the corresponding pixel in the image frame of the matching camera module 103 may correspond to the same point in the panorama.

In some embodiments, the video module 208 may construct pixels in a left or right panoramic image by blending pixels from image frames of multiple camera modules 103 according to weights associated with the multiple camera modules 103. An example pixel blending process is described below in more detail with reference to FIG. 8.

In some embodiments, the left and right panoramic images may be optimized for stereoscopic viewing in a horizontal plane (e.g., yaw∈[0°, 360°] and pitch=0°). Alternatively or additionally, the left and right panoramic images may be optimized based on a user's viewing direction. For example, the video module 208 may adaptively construct the streams of left panoramic images and right panoramic images based on the user's current viewing direction. A panorama provided by the streams of left and right panoramic images may have a high-resolution in the user's current viewing direction and a low-resolution in a reverse viewing direction. This panorama may be referred to as a directional panorama. As the user rotates his or her head to view the panorama in a new viewing direction, the directional panorama may be adjusted to have a high resolution in the new viewing direction and a low resolution in a viewing direction opposite to the new viewing direction. Since only a directional panorama is constructed, bandwidth and other resources may be saved compared to constructing a full high-resolution panorama. However, quality of the 3D viewing experience is not affected if the user does not change viewing directions rapidly.

In some embodiments, a constructed left or right panoramic image may have color deficiencies. For example, since the lenses in the camera modules 103 may point to different directions, light and color conditions may vary for the different lenses. Some image frames taken by some camera modules 103 may be over-exposed while some other image frames taken by other camera modules 103 may be under-exposed. The exposure or color deficiencies between image frames from different camera modules 103 may be corrected by the correction module 210 during a construction process of the left or right panoramic image.

Additionally or alternatively, due to the disparity between neighboring camera modules 103, a constructed left or right panoramic image may have stitching artifacts (or, stitching errors) where the viewpoint switches from a camera module 103 to a neighboring camera module 103. Objects that are far away from the camera modules 103 may have negligible disparity and there may be no stitching errors for the far-away objects. However, objects that are near the camera modules 103 may have noticeable disparity and there may be stitching errors for the nearby objects. Correction of the stitching errors is described below in more detail with reference to the correction module 210.

The correction module 210 may be software including routines for correcting aberrations in image frames or panoramic images. The correction module 210 is communicatively coupled to the bus 220 via a signal line 228. The aberrations may include calibration errors, exposure or color deficiencies, stitching artifacts, and other types of aberrations. The stitching artifacts may include errors made by the video module 208 when stitching image frames from various camera modules 103 to form a left or right panoramic image. The correction module 210 may analyze the image frames or the panoramic images to identify the aberrations. The correction module 210 may process the image frames or panoramic images to mask or correct the aberrations. The correction module 210 may automatically correct the aberrations or provide an administrator of the content system 131 with tools or resources to manually correct the aberrations.

In some embodiments, the correction module 210 receives image frames captured by a camera module 103 and corrects calibration errors on the image frames. For example, the correction module 210 may correct lens distortion (e.g., barrel or pin-cushion distortion) and camera orientation errors in the image frames based on lens distortion parameters, a position, and a rotational offset associated with the camera module 103.

In another example, the correction module 210 may analyze the image frames captured by the camera module 103, determine the calibration errors present in the image frames, and determine calibration factors used to calibrate the camera module 103. The calibration factors may include data used to automatically modify the image frames captured by the camera module 103 so that the image frames include fewer errors. In some embodiments, the calibration factors are applied to the image frames by the correction module 210 so that the image frames include no errors that are detectable during user consumption of the VR content. For example, the correction module 210 may detect the deficiencies in the image frames caused by the calibration errors. The correction module 210 may determine one or more pixels associated with the deficiencies. The correction module 210 may determine the pixel values associated with these pixels and then modify the pixel values using the calibration factors so that the deficiencies are corrected. In some embodiments, the calibration factors may also be provided to an administrator of the camera array 101 who uses the calibration factors to manually correct the calibration deficiencies of the camera array 101.

In some embodiments, the correction module 210 may detect and correct exposure or color deficiencies in the image frames captured by the camera array 101. For example, the correction module 210 may determine one or more pixels associated with the exposure or color deficiencies. The correction module 210 may determine the pixel values associated with these pixels and then modify the pixel values so that the exposure or color deficiencies are not detectable by the user 134 during consumption of the virtual reality content using the viewing system 133. In some embodiments, the camera modules 103 of the camera array 101 have overlapping fields of view, and exposure or color deficiencies in the image frames captured by the camera array 101 may be corrected or auto-corrected using this overlap. In other embodiments, exposure or color deficiencies in the image frames captured by the camera array 101 may be corrected using calibration based on color charts of known values.

In some embodiments, the correction module 210 may correct stitching errors caused by close-by objects. For example, the closer an object is to the camera array 101, the greater the difference of a viewing angle from each camera module 103 to the object. Close-by objects that cross a stitching boundary may abruptly transition between viewing angles and may thus produce an obvious visual discontinuity. This may be referred to herein as the "close object problem." Stitching artifacts may be incurred for close-by objects. One example mechanism to reduce the stitching errors may include increasing the number of camera modules 103 distributed throughout a spherical housing case of the camera array 101 to approach an ideal of a single, continuous, and spherical image sensor. The mechanism may reduce the viewing angle discrepancy between neighboring cameras and may thus reduce the stitching artifacts. Alternatively, virtual cameras may be interpolated between real cameras to simulate an increasing camera density so that stitching artifacts may be reduced. Image stitching using virtual cameras is described in more detail in U.S. application Ser. No. 14/465,581, titled "Image Stitching" and filed Aug. 21, 2014, which is incorporated herein in its entirety by reference.

The audio module 212 may be software including routines for generating a stream of 3D audio data configured to render 3D audio when played back on an audio reproduction device. The audio module 212 is communicatively coupled to the bus 220 via a signal line 230. The audio module 212 may generate the 3D audio data based on the raw audio data received from the microphone array 107. In some embodiments, the audio module 212 may process the raw audio data to generate four-channel ambisonic audio tracks corresponding to the 3D video data generated by the video module 208. The four-channel ambisonic audio tracks may provide a compelling 3D 360-degree audio experience to the user 134.

In some embodiments, the four-channel audio tracks may be recorded in an "A" format by the microphone array 107 such as a Tetramic microphone. The audio module 212 may transform the "A" format four-channel audio tracks to a "B" format that includes four signals: W, X, Y, and Z. The W signal may represent a pressure signal that corresponds to an omnidirectional microphone, and the X, Y, Z signals may correspond to directional sounds in front-back, left-right, and up-down directions, respectively. In some embodiments, the "B" format signals may be played back in a number of modes including, but not limited to, mono, stereo, binaural, surround sound including four or more speakers, and any other modes. In some examples, an audio reproduction device may include a pair of headphones, and the binaural playback mode may be used for the sound playback in the pair of headphones. The audio module 212 may convolve the "B" format channels with Head Related Transfer Functions (HRTFs) to produce binaural audio with a compelling 3D listening experience for the user 134. In some embodiments, the audio is compatible with Dolby® Atmos™.

In some embodiments, the audio module 212 generates 3D audio data that is configured to provide sound localization to be consistent with the user's head rotation. For example, if a sound is emanating from the user's right-hand side and the user rotates to face the sound, the audio reproduced during consumption of the virtual reality content sounds as if it is coming from in front of the user.

In some embodiments, the raw audio data is encoded with the directionality data that describes the directionality of the recorded sounds. The audio module 212 may analyze the directionality data to produce 3D audio data that changes the sound reproduced during playback based on the rotation of the user's head orientation. For example, the directionality of the sound may be rotated to match the angle of the user's head position. Assume that the virtual reality content depicts a forest with a canopy of tree limbs overhead. The audio for the virtual reality content includes the sound of a river. The directionality data indicates that the river is behind the user 134, and so the 3D audio data generated by the audio module 212 is configured to reproduce audio during playback that makes the river sound as if it is located behind the user 134. This is an example of the 3D audio data being configured to reproduce directionality. Upon hearing the audio for the river, the user 134 may sense that the river is behind him or her. The 3D audio data is configured so that as the user 134 tilts his or her head to the side, the sound of the water changes. As the angle of the tilt approaches 180 degrees relative to the starting point, the river sounds as though it is in front of the user 134. This is an example of the 3D audio data being configured to reproduce directionality based on the angle of the user's 134 head position. The 3D audio data may be configured so that the sound of the river becomes more distinct and clearer, and the user 134 has a better sense of how far the water is from the user 134 and how fast the water is flowing.

The stream combination module 214 may be software including routines for combining a stream of 3D video data and a stream of 3D audio data to generate virtual reality content. The stream combination module 214 is communicatively coupled to the bus 220 via a signal line 229. The stream of 3D video data includes a stream of left panoramic images for left eye viewing and a stream of right panoramic images for right eye viewing. Redundancy exists between the stream of left panoramic images and the stream of right panoramic images.

The stream combination module 214 may compress the stream of left panoramic images and the stream of right panoramic images to generate a stream of compressed 3D video data using video compression techniques. In some embodiments, within each stream of the left or right panoramic images, the stream combination module 214 may use redundant information from one frame to a next frame to reduce the size of the corresponding stream. For example, with reference to a first image frame (e.g., a reference frame), redundant information in the next image frames may be removed to reduce the size of the next image frames. This compression may be referred to as temporal or inter-frame compression within the same stream of left or right panoramic images.

Alternatively or additionally, the stream combination module 214 may use one stream (either the stream of left panoramic images or the stream of right panoramic images) as a reference stream and may compress the other stream based on the reference stream. This compression may be referred to as inter-stream compression. For example, the stream combination module 214 may use each left panoramic image as a reference frame for a corresponding right panoramic image and may compress the corresponding right panoramic image based on the referenced left panoramic image.

In some embodiments, the stream combination module 214 may encode the stream of 3D video data (or compressed 3D video data) and 3D audio data to form a stream of virtual reality content. For example, the stream combination module 214 may compress the stream of 3D video data using H.264 and the stream of 3D audio data using advanced audio coding (AAC). In another example, the stream combination module 214 may compress the stream of 3D video data and the stream of 3D audio data using a standard MPEG format. The virtual reality content may be constructed by the stream combination module 214 using any combination of the stream of 3D video data (or the stream of compressed 3D video data), the stream of 3D audio data (or the stream of compressed 3D audio data), content data from the content server 139, advertisement data from the ad server 141, social data from the social network server 135, and any other suitable virtual reality content.

In some embodiments, the virtual reality content may be packaged in a container format such as MP4, WebM, VP8, and any other suitable format. The virtual reality content may be stored as a file on the client device 127 or the server 129 and may be streamed to the viewing system 133 for the user 134 from the client device 127 or the server 129. Alternatively, the virtual reality content may be stored on a digital versatile disc (DVD), a flash memory, or another type of storage devices.

The advertising module 216 may be software including routines for adding advertisements to the virtual reality content generated by the content system 131. For example, the ad server 141 stores and transmits advertisement data that describes one or more advertisements. The advertising module 216 incorporates the advertisements in the virtual reality content. For example, the advertisement includes an image, audio track, or video, and the advertising module 216 incorporates the advertisement into the virtual reality content. The advertisement may be a video that is stitched in the virtual reality content. In some embodiments, the advertisement includes an overlay that the advertising module 216 incorporates in the virtual reality content. For example, the overlay includes a watermark. The watermark may be an advertisement for a product or service. In some embodiments, the advertisements from the ad server 141 include ad data describing a location for displaying the advertisement. In this case, the advertising module 216 may display the advertisements according to the ad data. The advertising module 216 may be communicatively coupled to the bus 220 via a signal line 217.

In some embodiments, the advertisement data includes data describing how the advertisement may be incorporated in the virtual reality content. For example, the advertisement data describes where the advertisement may be included in the virtual reality content. The advertising module 216 may analyze the advertisement data and incorporate the advertisement in the virtual reality content according to the advertisement data. In other embodiments, the user 134 provides user input to the advertising module 216 and the user input specifies a user preference describing how the advertisement may be incorporated in the virtual reality content. The advertising module 216 may analyze the user input and incorporate the advertisement based at least in part on the user input.

Figure 3A:
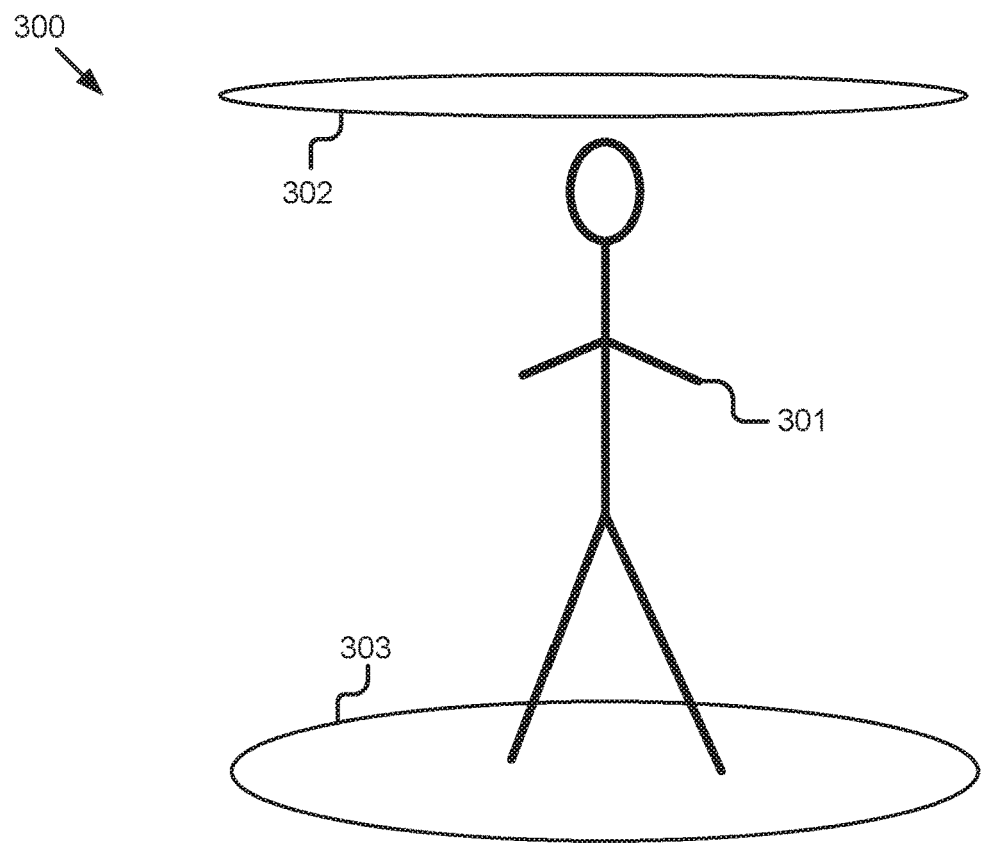
FIG. 3A illustrates different panels where virtual reality content may be displayed.

The advertisement may take many forms. For example, the advertisement may be a logo for a company or product placement of a graphical object that a user can interact with. In some embodiments, the advertising module 216 inserts the advertisement into an area where users commonly look. In other embodiments, the advertising module 216 inserts the advertisement into less commonly used areas. For example, FIG. 3A is an illustration 300 of a user 301 with virtual reality content displayed in a top panel 302 and a bottom panel 303. The user 301 is able to view the virtual reality content in the top panel 302 by moving his or her head upwards. The user 301 is able to view the virtual reality content in the bottom panel 303 by moving his or her head downwards.

Figure 3B:
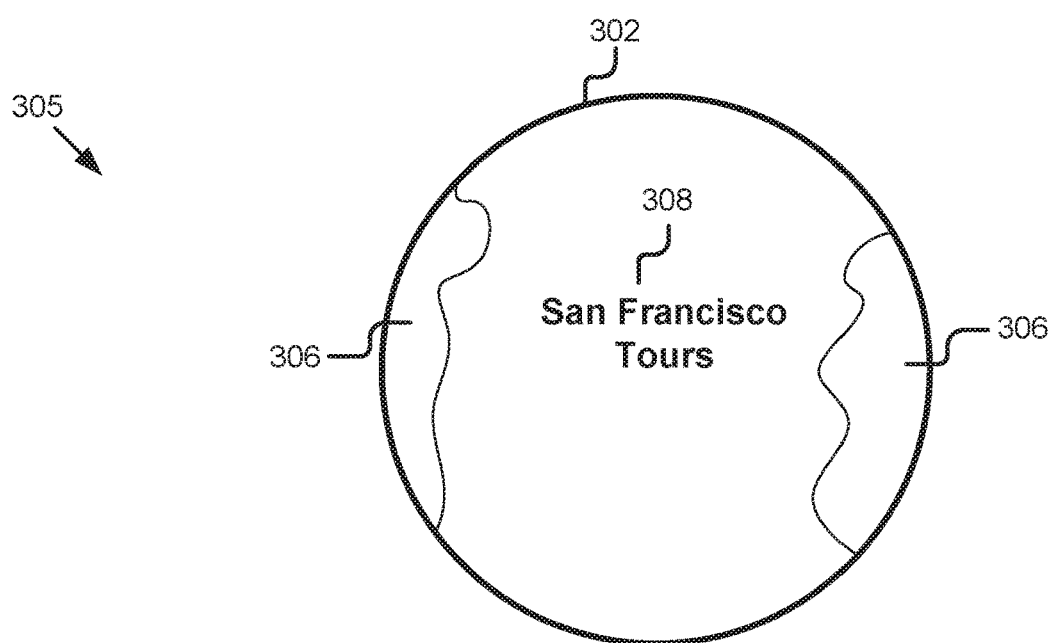
FIG. 3B illustrates an example advertisement that is displayed as part of the virtual reality content.

FIG. 3B is an illustration 305 of how the advertising module 216 might incorporate an advertisement into one of the panels in FIG. 3A. For example, FIG. 3B illustrates a top panel 302. The virtual reality content is of a forest. The user can see the edges of trees 306 in the top panel 302. In the center of the top panel 302, the advertising module 216 inserts an advertisement 308 for San Francisco tours. The top panel 302 may be a good place for advertisements because the advertisement does not overlap with virtual reality content that may be important for the user to view.

In some embodiments, the virtual reality content includes a stitching aberration caused by errors in generating the virtual reality content. An element of the content system 131 such as the correction module 210 analyzes the virtual reality content to identify the stitching aberration. The correction module 210 transmits data that describes the location of the stitching aberration in the virtual reality content to the advertising module 216. The advertising module 216 incorporates an advertisement at the location of the stitching aberration in the virtual reality content so that the stitching aberration is not visible to the user 134 upon playback of the virtual reality content.

In one embodiment, the advertising module 216 determines where to place advertisements based on user gaze. For example, the advertising module 216 receives information about how the user interacts with the virtual reality content from the viewing system 133. The information may include a location within each frame or a series of frames where the user looks. For example, the user spends five seconds staring at a table within the virtual reality content. In another example, the advertising module 216 determines the location of user gaze based on where users typically look. For example, users may spend 80% of the time looking straight ahead.

The advertising module 216 may determine a cost associated with advertisements to charge advertisers. For example, the advertising module 216 charges advertisers for displaying advertisements from the ad server 141. In some embodiments, the advertising module 216 determines a cost for displaying the advertisement based on the location of the advertisement. The cost may be based on where the users look within a particular piece of virtual reality content, where users general look at virtual reality content, personalized for each user, etc. In some embodiments, the advertising module 216 determines a cost associated with interacting with advertisements. For example, similar to an online magazine that charges more money when a user clicks on an advertisement (click through), the advertising module 216 may charge more money when the advertising module 216 determines based on user gaze that a user looked at a particular advertisement. In some embodiments, the advertising module 216 generates links for the advertisements such that a user may select the advertisement to be able to view virtual reality content about the advertisement, such as a virtual reality rendering of the advertiser's webpage. The advertising module 216 may charge more for this action since it is also similar to a click through.

The advertising module 216 may generate a profile for users based on the user's gaze at different advertisements. The advertising module 216 may identify a category for the advertisement and determine that the user is interested in the category or the advertiser associated with the category. In some embodiments, the advertising module 216 determines a cost for displaying advertisements based on the user profile. For example, the advertising module 216 determines that a user is interested in potato chips, or is interested in a specific manufacturer of potato chips. As a result, the advertising module 216 charges more for displaying advertisements for potato chips to that user than other users without a demonstrated interest in potato chips.

The social module 218 may be software including routines for enabling the viewing system 133 or the content system 131 to interact with the social network application 137. For example, the social module 218 may generate social data describing the user's 134 interaction with the viewing system 133 or the content system 131. The interaction may be a status update for the user 134. The user 134 may approve the social data so that social data describing the user 134 will not be published without the user's 134 approval. In one embodiment, the social module 218 transmits the social data to the communication unit 245 and the communication unit 245 transmits the social data to the social network application 137. In another embodiment, the social module 218 and social network application 137 are the same. The social module 218 may be communicatively coupled to the bus 220 via a signal line 219.

In some embodiments, the social network application 137 generates a social graph that connects users based on common features. For example, users are connected based on a friendship, an interest in a common subject, one user follows posts published by another user, etc. In one embodiment, the social module 218 includes routines for enabling the user 134 and his or her connections via the social graph to consume virtual reality content contemporaneously. For example, the content system 131 is communicatively coupled to two or more viewing systems 133. A first user 134 is connected to a second user 134 in a social graph. The first user 134 interacts with a first viewing system 133 and the second user 134 interacts with a second viewing system 133. The first user 134 and the second user 134 may consume virtual reality content provided by the content system 131 using their respective viewing systems 133 simultaneously. In some embodiments, the consumption of the virtual reality content may be integrated with the social network.

In some embodiments, the social module 218 transmits information about user interactions with virtual reality content to the social network application 137. For example, the social module 218 may determine subject matter for an entire video or frames within the video. The social module 218 may transmit information about the subject matter and the user to the social network application 137, which generates a social graph based on shared subject matter. In some embodiments, the social module 218 receives information about how the user reacts to advertisements from the viewing system 133 and transmits the information to the social network application 137 for incorporation into the social graph. For example, the viewing system 133 transmits information about how the user's gaze indicates that the user is interested in advertisements about home decorating. The social module 218 transmits the user's interest in home decorating to the social network application 137, which updates the user's profile with the interest and identifies other users that the user could connect with that are also interested in home decorating. In another embodiment, the social network application 137 uses the information about advertisements to provide advertisements within the social network to the user.

In some embodiments, the social network application 137 suggests connections between users based on their interactions with the virtual reality content. For example, if both a first user and a second user access the same virtual reality content, the social network application 137 may suggest that they become friends. In another example, if two users access virtual reality content with the same subject matter, the social network application 137 suggests that they become connected. In yet another example, where a first user on the social network is an expert in a type of subject matter and the second user views a threshold number of pieces of virtual reality content with the same subject matter, the social network application 137 suggests that the second user follow the first user in the social network.

The social network application 137 may suggest that the user join groups in the social network based on the user's consumption of virtual reality content. For example, for a user that views virtual reality content that involves science fiction adventures with other users, the social network application 137 suggests a group in the social network about science fiction roleplaying.

In some embodiments, the social module 216 transmits information about user interactions to the social network application 137 that the social network application 137 uses for posting updates about the user. The update may include information about the type of user interaction that is occurring, information about the virtual reality content, and a way to access the virtual reality content. The social network application 137 may post an update about a first user to other users in the social network that are connected to the first user via a social graph. For example, the update is viewed by friends of the first user, friends of friends of the first user, or a subset of connections of the first user including only close friends. The social network application 137 may also post the update to other users that have viewed the same virtual reality content or demonstrated an interest in subject matter that is part of the virtual reality content.

In some embodiments, the social network application 137 determines subject matter associated with the virtual reality content and determines other users that are interested in the subject matter. For example, the social network application 137 determines that users are expressly interested in the subject matter because it is listed as part of a user profile that they created during registration. In another example, the social network application 137 uses implicit activities to determine interest in the subject matter, such as a user that watches a predetermined number of videos with the subject matter or posts a predetermined number of articles about the subject matter. The social network application 137 may limit social network updates about user interactions with virtual reality content to other users that are interested in the same subject matter.

In some embodiments, the social network application 137 posts updates as long as the virtual reality content is not sensitive. In some embodiments, the social network application 137 provides users with user preferences about the type of subject matter that cannot be part of the updates. For example, where the social network is for business connections, the social network application 137 does not post updates about users consuming virtual reality content involving celebrities.

Figure 3C:
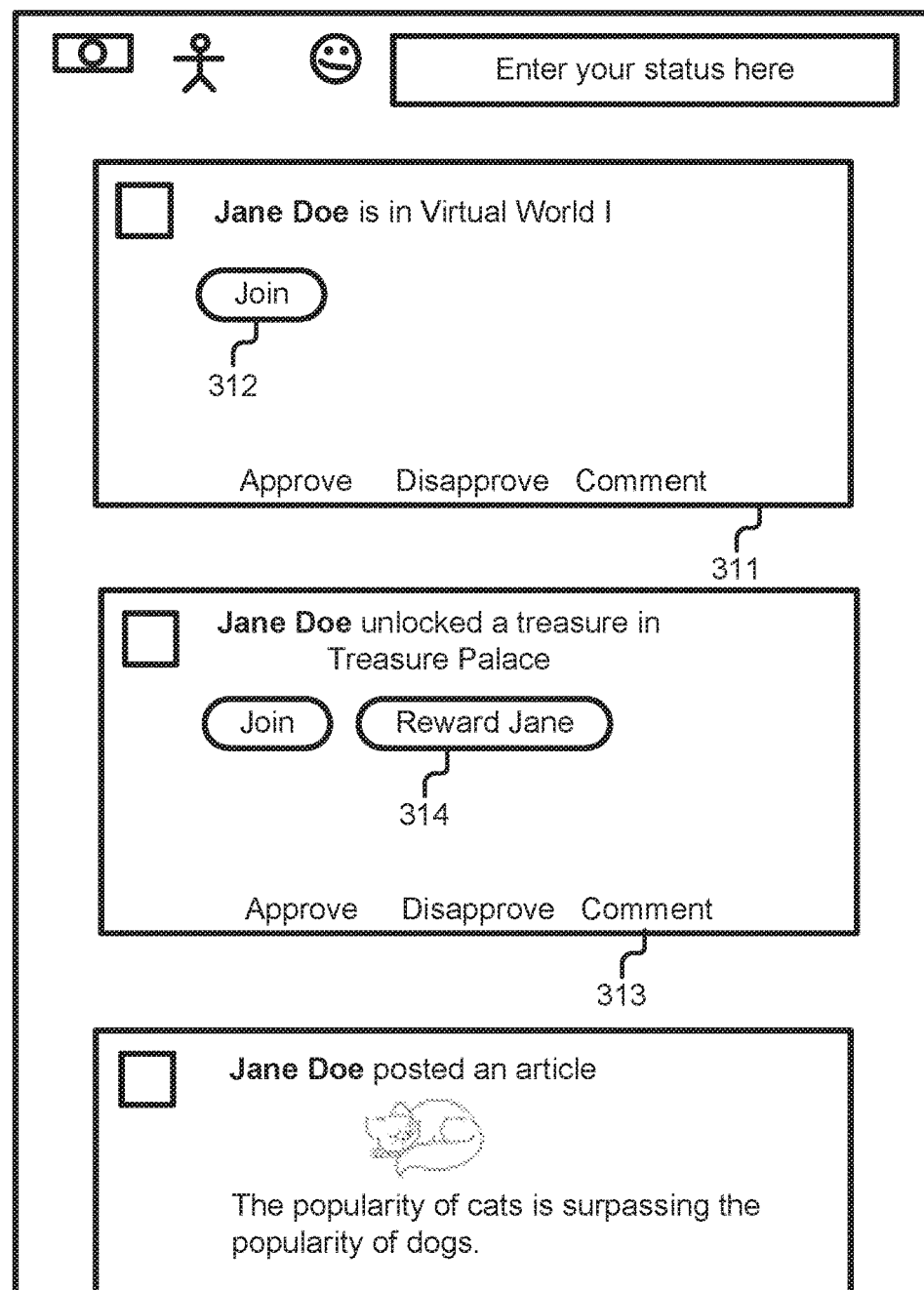
FIG. 3C illustrates example social network content.

FIG. 3C is an example illustration 310 of a profile page of social network updates for a user. In this example the user Jane Doe has had user interactions with virtual reality content for Virtual World I and Treasure Palace. The first update 311 of virtual reality content includes identification of the user, a join button 312, and links for approving, disapproving, or commenting on the update. If a user clicks the join button 312, in one embodiment, the social network application 137 instructs the content system 131 to launch. The approval link can take many forms, such as like, +1, thumbs up, etc. The disapproval link can take many forms, such as −1, dislike, thumbs down, etc.

The second update 313 of virtual reality content includes a status update about the user's progress in a virtual reality game. In this example, another user may be able to provide in-game rewards to the user by selecting the reward Jane button 314. For example, selecting the button could cause the social network application 137 to instruct the content system 131 to provide the user with an additional life, credits for purchasing objects in the same, time, etc.

The content module 256 may be software including routines for enabling the content system 131 to receive content from the content server 139 and, in some embodiments, provide analysis of virtual reality content. For example, the content server 139 stores content such as videos, images, music, video games, or any other VR content suitable for playback by the viewing system 133. The content module 256 may be communicatively coupled to the bus 220 via a signal line 257.

In some embodiments, the content server 139 is communicatively coupled to a memory that stores content data. The content data includes video data or audio data. For example, since a video may include a series of images synchronized with a corresponding audio track, a video stored on the content sever 139 has a video element and an audio element. The video element is described by the video data and the audio element is described by the audio data. In this example, the video data and the audio data are included in the content data transmitted by the content server 139. The content system 131 receives the content data and proceeds to generate virtual reality content for the viewing system 133 based at least in part on the video data and the audio data included in the content data. Similar examples are possible for images, music, video games, or any other content hosted by the content server 139.

In some embodiments, the content module 256 provides analysis of the virtual reality content. For example, the content module 256 may receive information about the location of all users' gazes and aggregate the information. The content module 256 may generate a heat map where different colors correspond to a number of users that looked at a particular location in the image. For example, where the image is a room in a kitchen, the heat map illustrates that most users looked at the kitchen table and appliances and fewer users looked at the wall.

The content module 256 may use analytics data to generate playlists of virtual reality content. For example, the content module 256 may determine the popularity of different virtual reality experiences. The popularity may be based on a number of users that access the virtual reality content, user ratings after a user has interacted with the virtual reality content, etc. The playlists may be topic based, such as the 10 best depictions of Paris, France or may be based on overall popularity, such as the 50 best virtual reality content available. In some embodiments, the content module 256 generates playlists from people that are experts in subject matter. For example, the content module 256 generates a playlist of the best cooking videos as rated (or created) by well-known chefs. In another example, the content module 256 accepts playlists created by experts, such as the best virtual reality content about technology that was submitted by an owner of a billion-dollar technology company.

In some embodiments, the content module 256 manages gamification of the virtual reality content. The content module 256 may track user interactions with the virtual reality content and provides rewards for achieving a threshold amount of user interactions. For example, the content module 256 rewards a user with new virtual reality content when the user identifies five objects in the game. The content module 256 may also provide clues for how to find the objects.

Figure 3D:
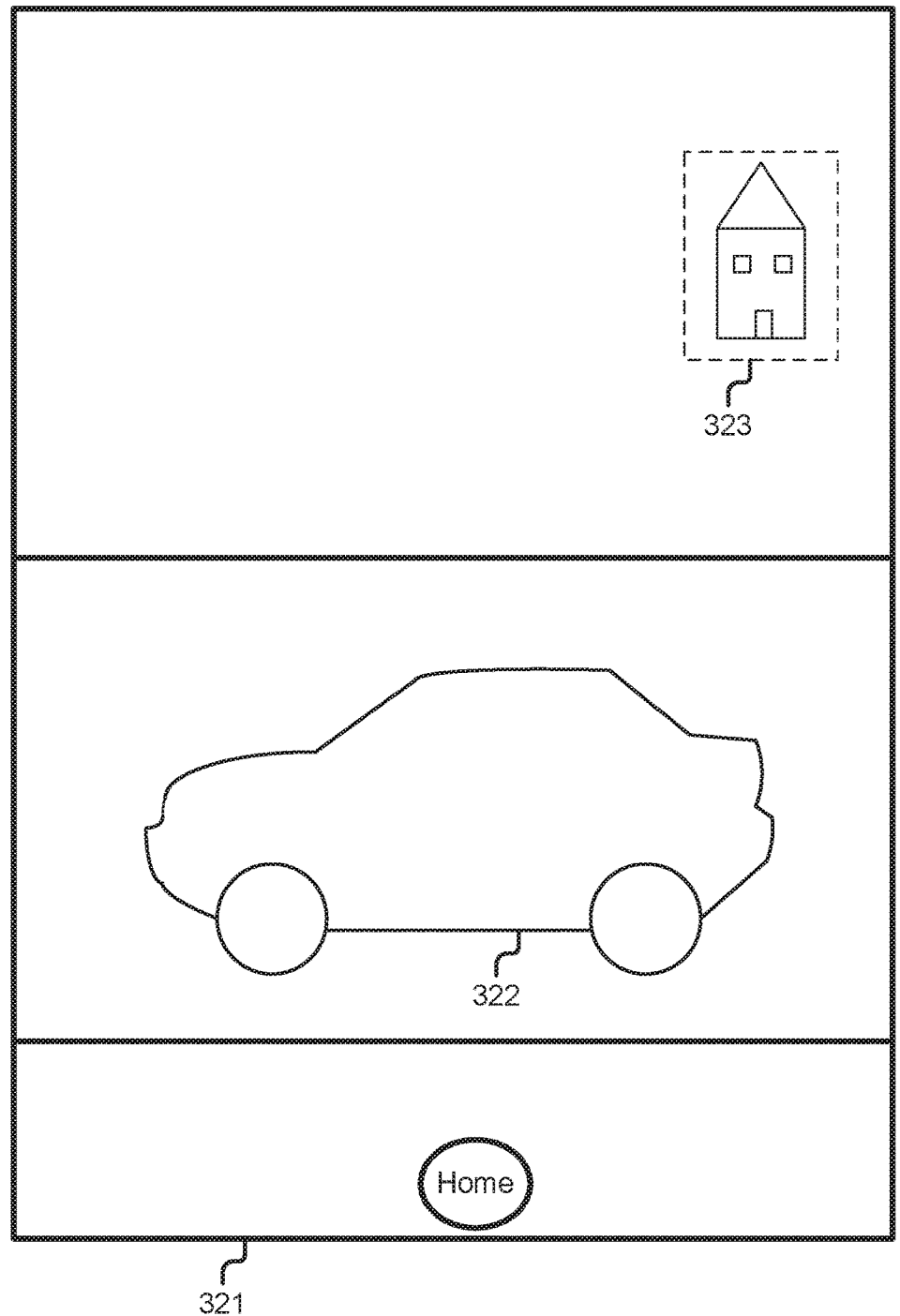
FIG. 3D illustrates example virtual reality content that includes a link to additional virtual reality content.

In some embodiments, the content module 256 generates links within virtual reality content for users to move from one virtual reality experience to another. FIG. 3D illustrates 320 an example of virtual reality content 321 where the user is experiencing walking around and approaching a road with cars 322 on the road. In the upper right-hand corner is a linked image 323 that the user could select to access virtual reality content of a house. The user may use a peripheral device, such as a glove to reach out and touch the linked image 323. In some embodiments, the content system 131 recognizes a particular motion for accessing the linked image 323, such as making a tap with an index finger similar to using a mouse to click on an object. The user may also access a peripheral device, such as a mouse, to position a cursor on the screen to select the linked image 323.

Example Methods

Figure 4A:
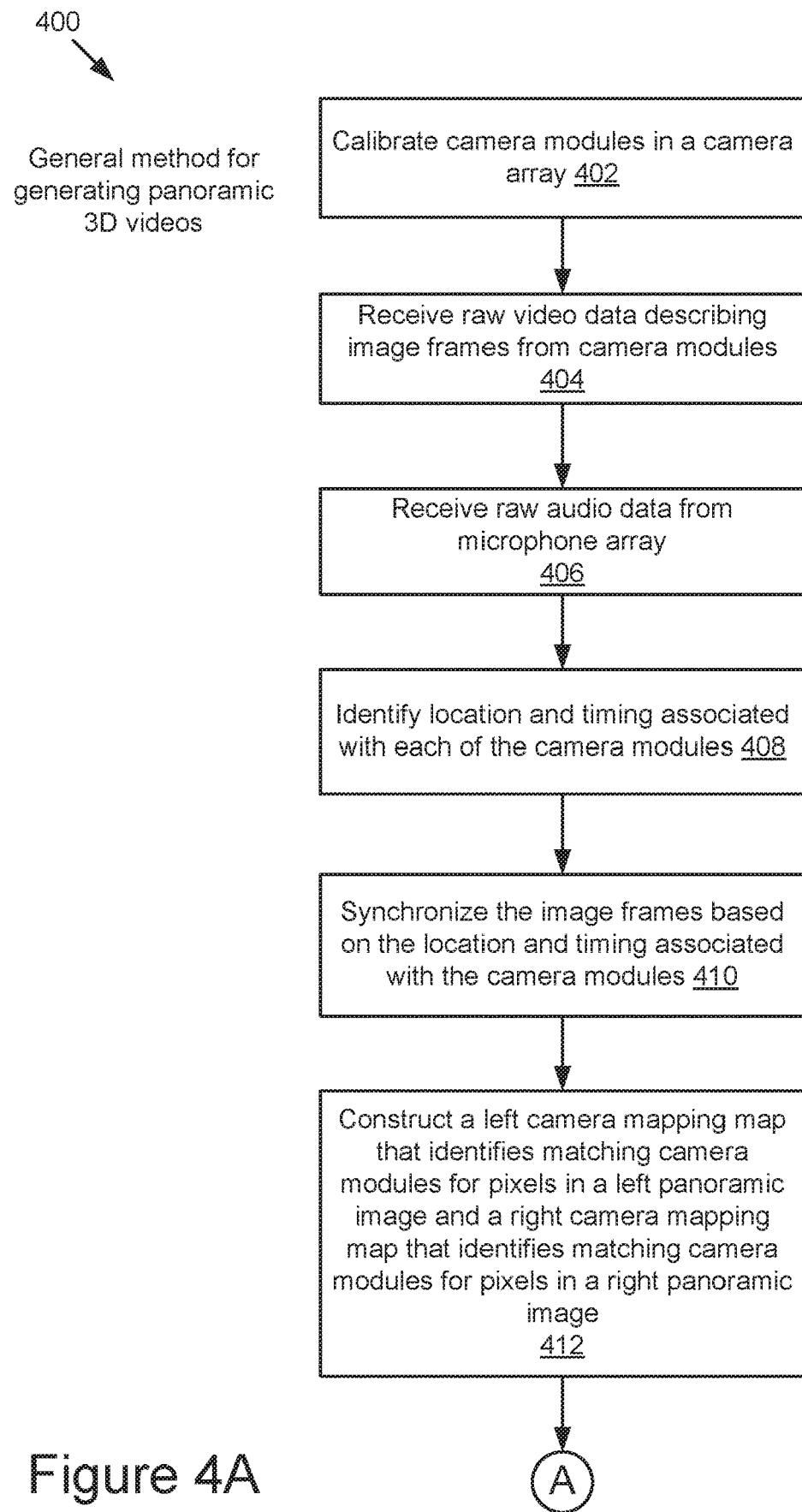
FIGS. 4A-4C illustrate an example method for aggregating image frames and audio data to generate VR content according to some embodiments.
Figure 4B:
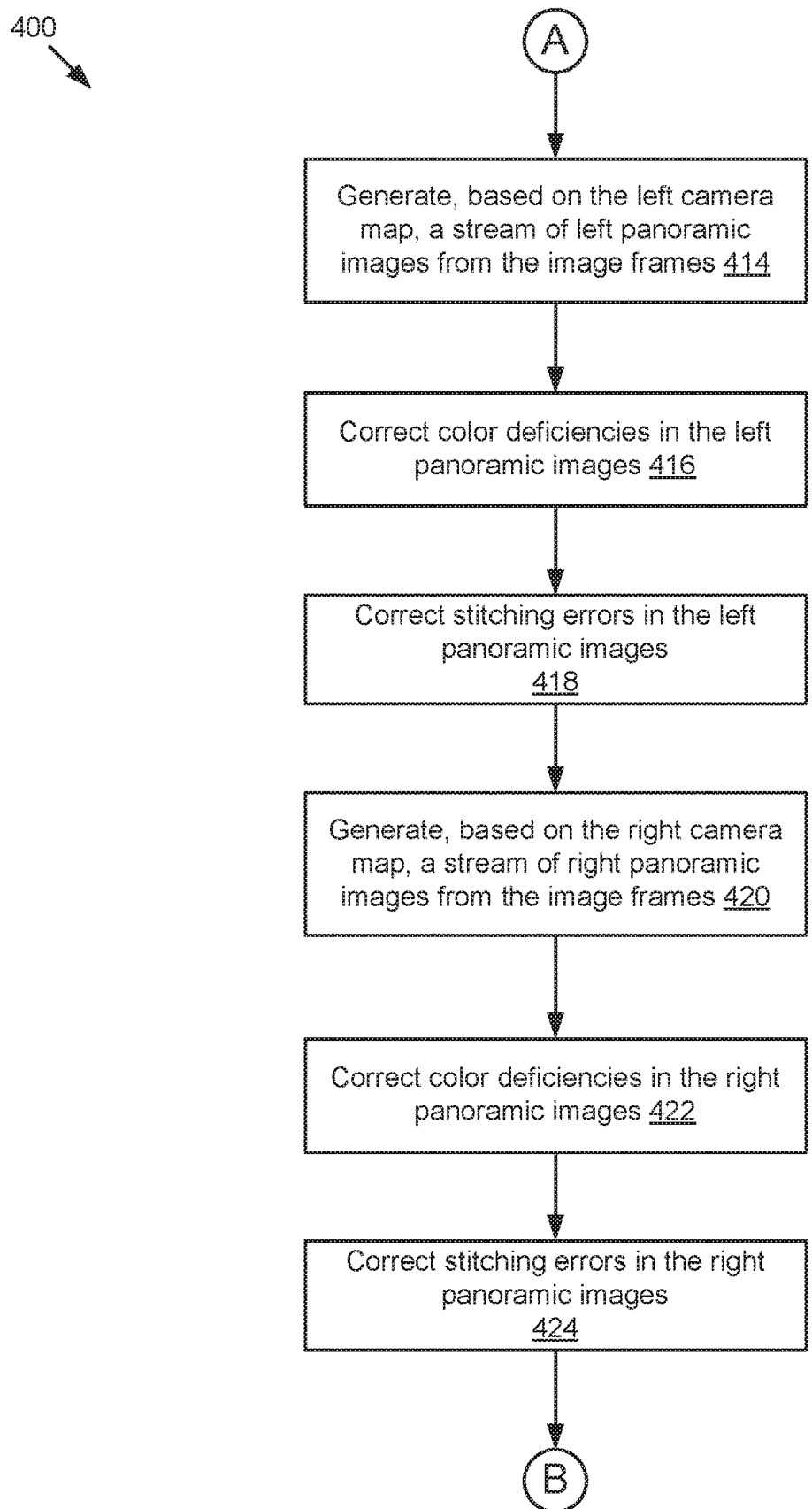
Figure 4C:
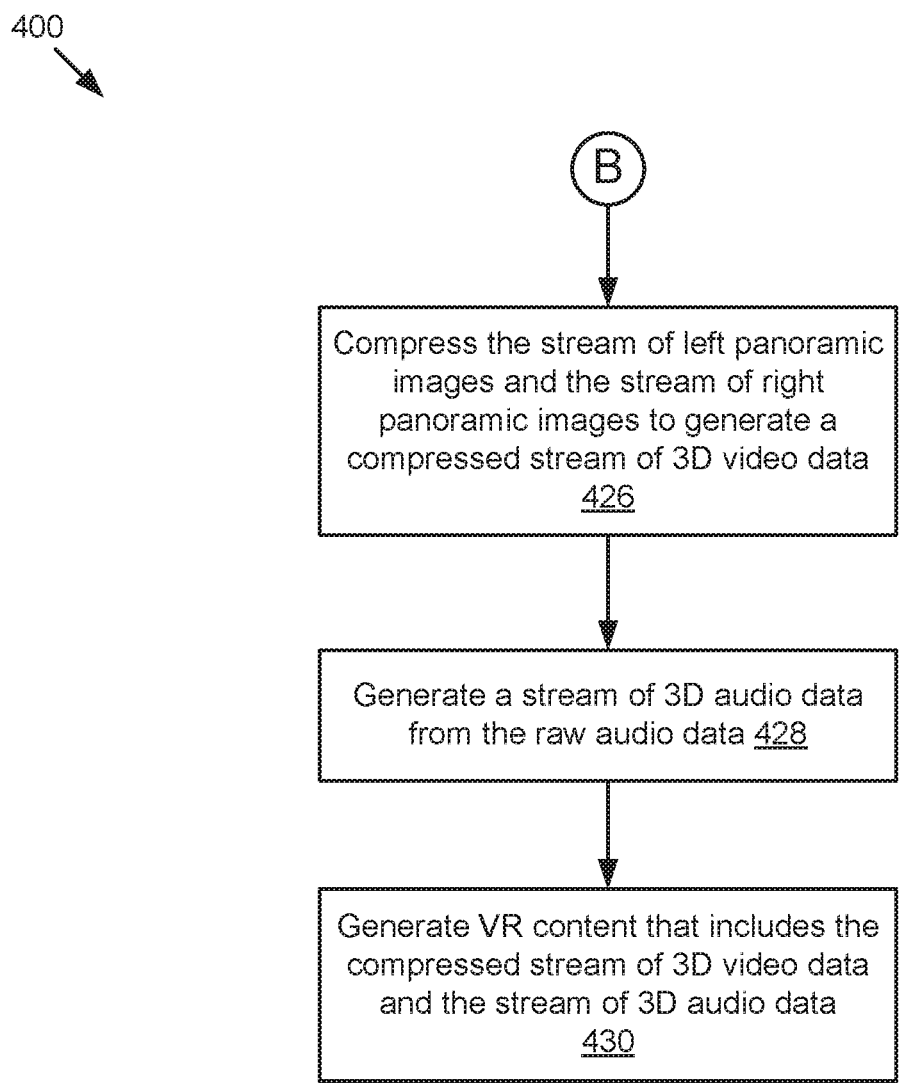

FIGS. 4A-4C illustrate an example method 400 for aggregating image frames and audio data to generate virtual reality content according to some embodiments. The method 400 is described with respect to FIGS. 1 and 2. Although illustrated as discrete blocks, various blocks may be divided into additional blocks, combined into fewer blocks, or eliminated, depending on the desired embodiment.

Referring to FIG. 4A, the calibration module 204 calibrates 402 the camera modules 103 in the camera array 101. The communication module 202 receives 404 raw video data describing image frames from the camera modules 103. The communication module 202 receives 406 raw audio data from the microphone array 107. The video module 208 identifies 408 a location and timing associated with each of the camera modules 103. The video module 208 synchronizes 410 the images frames based on locations and timings associated with the camera modules 103. The camera mapping module 206 constructs 412 a left camera map and a right camera map. The left camera map identifies matching camera modules 103 for pixels in a left panoramic image. For example, for a pixel in a left panoramic image that represents a point in a panorama, the left camera map identifies a matching camera module 103 that has a better view to the point than other camera modules 103. Similarly, the right camera map identifies matching camera modules 103 for pixels in a right panoramic image.

Referring to FIG. 4B, the video module 208 generates 414, based on the left camera map, a stream of left panoramic images from the image frames. For example, the video module 208 identifies matching camera modules 103 for pixels in left panoramic images based on the left camera map. For a particular time frame, the video module 208 stitches image frames synchronized at the particular time frame from the corresponding matching camera modules 103 to form a left panoramic image for the particular time frame. The correction module 210 corrects 416 color deficiencies in the left panoramic images. The correction module 210 corrects 418 stitching errors in the left panoramic images.

The video module 208 generates 420, based on the right camera map, a stream of right panoramic images from the image frames. For example, the video module 208 identifies matching camera modules 103 for pixels in right panoramic images based on the right camera map. For a particular time, the video module 108 stitches image frames synchronized at the particular time from the corresponding matching camera modules 103 to form a right panoramic image for the particular time. The correction module 210 corrects 422 color deficiencies in the right panoramic images. The correction module 210 corrects 424 stitching errors in the right panoramic images.

Referring to FIG. 4C, the stream combination module 214 compresses 426 the stream of left panoramic images and the stream of right panoramic images to generate a compressed stream of 3D video data. The audio module 212 generates 428 a stream of 3D audio data from the raw audio data. The stream combination module 214 generates 430 VR content that includes the compressed stream of 3D video data and the stream of 3D audio data. In some embodiments, the stream combination module 214 may also compress the stream of 3D audio data to form a compressed stream of 3D audio data, and the VR content may include the compressed stream of 3D video data and the compressed stream of 3D audio data.

Figure 5:
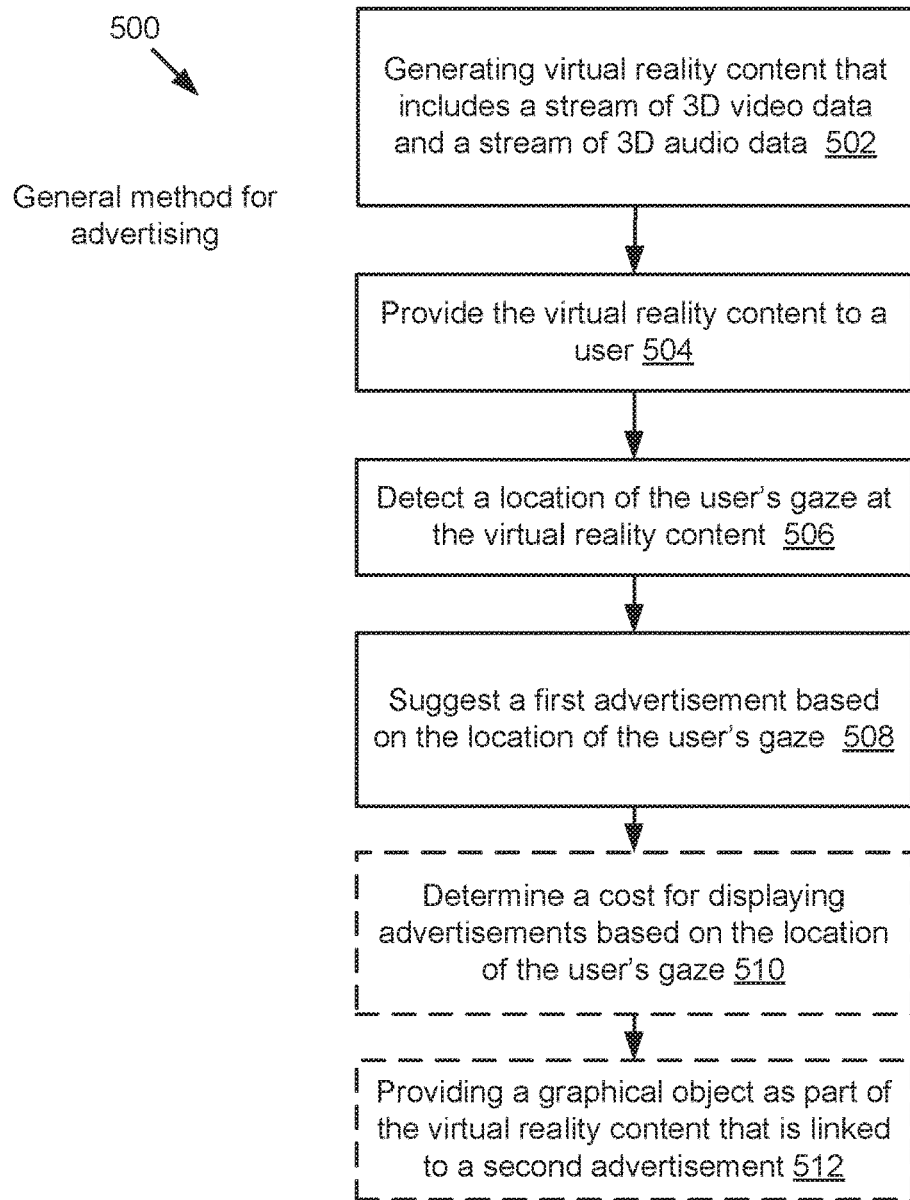
FIG. 5 illustrates an example method for generating advertisements in a virtual reality system.

FIG. 5 illustrates an example method 500 for generating advertisements in a virtual reality system. The method 500 is described with respect to FIGS. 1 and 2. Although illustrated as discrete blocks, various blocks may be divided into additional blocks, combined into fewer blocks, or eliminated, depending on the desired embodiment.

The stream combination module 214 generates 502 virtual reality content that includes a stream of three-dimensional video data and a stream of three-dimensional audio data. The stream combination module 214 provides 504 the virtual reality content to a user. The advertising module 216 detects 506 a location of the user's gaze at the virtual reality content. For example, the advertising module 216 receives user gaze information from the viewing system 133 or the advertising module 216 uses statistical information about where users typically look in virtual reality content. The advertising module 216 suggests 508 a first advertisement based on the location of the user's gaze. For example, the advertising module 216 determines that an advertisement should be placed where the user most commonly looks. In another example, the advertising module 216 determines that the advertisement should be placed in a location where the user looks less frequently so that the advertisement does not interfere with the virtual reality content.

In some embodiments, the advertising module 216 determines 510 a cost for displaying advertisements based on the location of the user's gaze. For example, the cost will be higher for regions where the user more commonly looks. In some embodiments, the advertising module 216 provides 512 a graphical object as part of the virtual reality content that is linked to a second advertisement. For example, the graphical object includes a soda can that the user can touch to access a second advertisement. The second advertisement may be displayed as part of the virtual reality content, such as a pop up window that appears above the object, or the second advertisement may be part of another application that is activated by the ad server 141 responsive to the user touching the graphical object.

Figure 6:
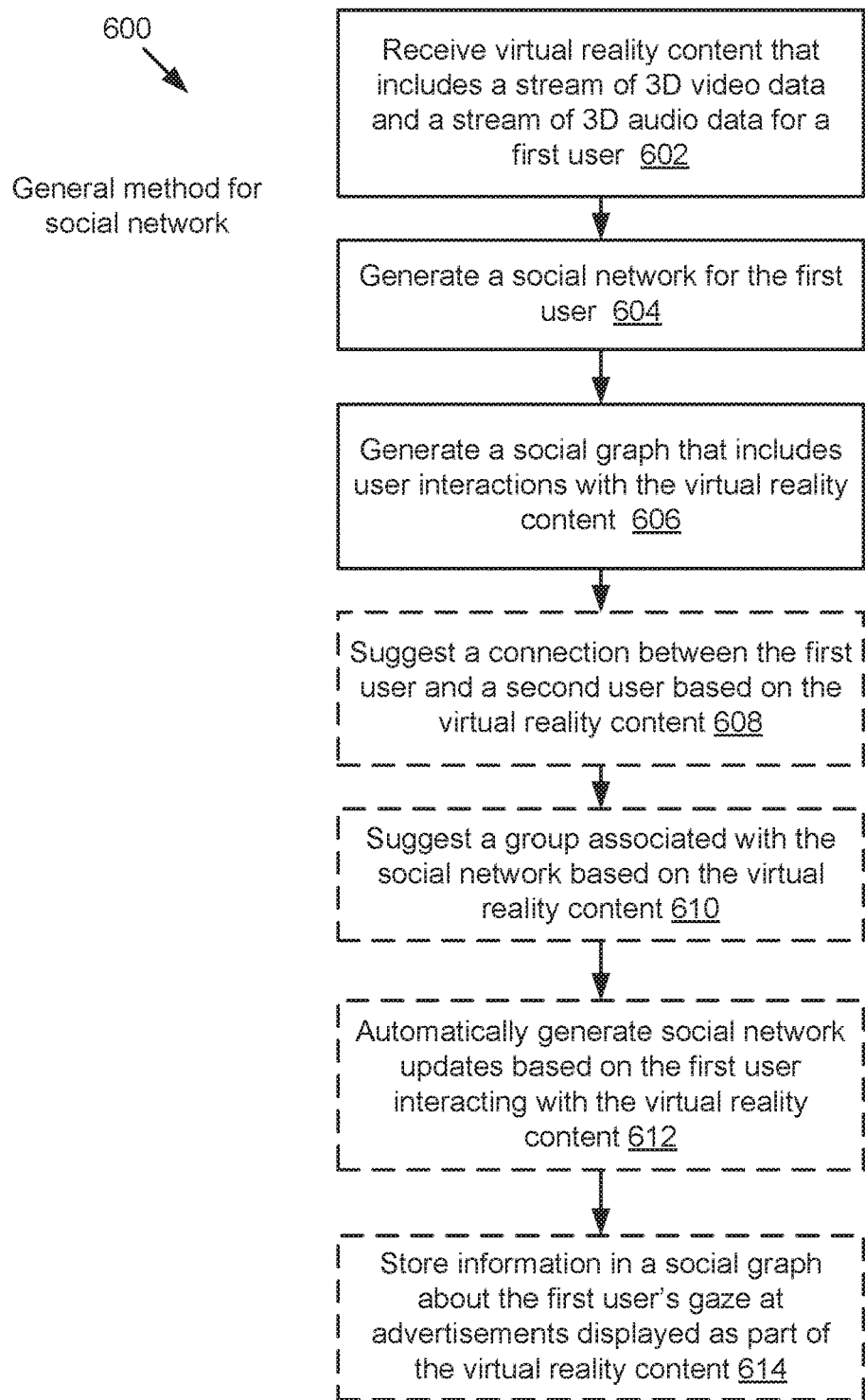
FIG. 6 illustrates an example method for generating a social network based on virtual reality content.

FIG. 6 illustrates an example method 600 for generating a social network based on virtual reality content. The method 600 is described with respect to FIGS. 1 and 2. Although illustrated as discrete blocks, various blocks may be divided into additional blocks, combined into fewer blocks, or eliminated, depending on the desired embodiment. Although the method 600 is described as a social network application 137 performing steps on a social network server 135 that is separate from the content system 131, the method steps may also be performed by the social module 218 that is part of the content system 131.

The social network application 137 receives 602 virtual reality content that includes a stream of three-dimensional video data and a stream of three-dimensional audio data for a first user from a content system 131. The social network application 137 generates 604 a social network for the first user. For example, the social network connects users based on a shared attribute. The social network application 137 generates 606 a social graph that includes user interactions with the virtual reality content. For example, users are connected in the social network based on users that message each other within the virtual reality world. In some embodiments, the social network application 137 generates links for connected users to view the same virtual reality content. For example, the users may click on buttons in the social network to launch the content system 131.

In one embodiment, the social network application 137 suggests 608 a connection between the first user and a second user based on the virtual reality content. For example, the social network application 137 makes a suggestion where the first and second users view the same virtual reality content. In another embodiment, the social network application 137 suggests 610 a group associated with the social network based on the virtual reality content. For example, the social network application 137 suggests a group about subject matter that is also part of virtual reality content that the user views. The social network application 137 may automatically generate 612 social network updates based on the first user interacting with the virtual reality content. For example, the social network application 137 generates an update when a user begins a stream, achieves a goal, etc. The social network application 137 may store 614 information in a social graph about the first user's gaze at advertisements displayed as part of the virtual reality content. In some embodiments, the social network application 137 uses the information to display advertisements within the social network.

Figure 7:
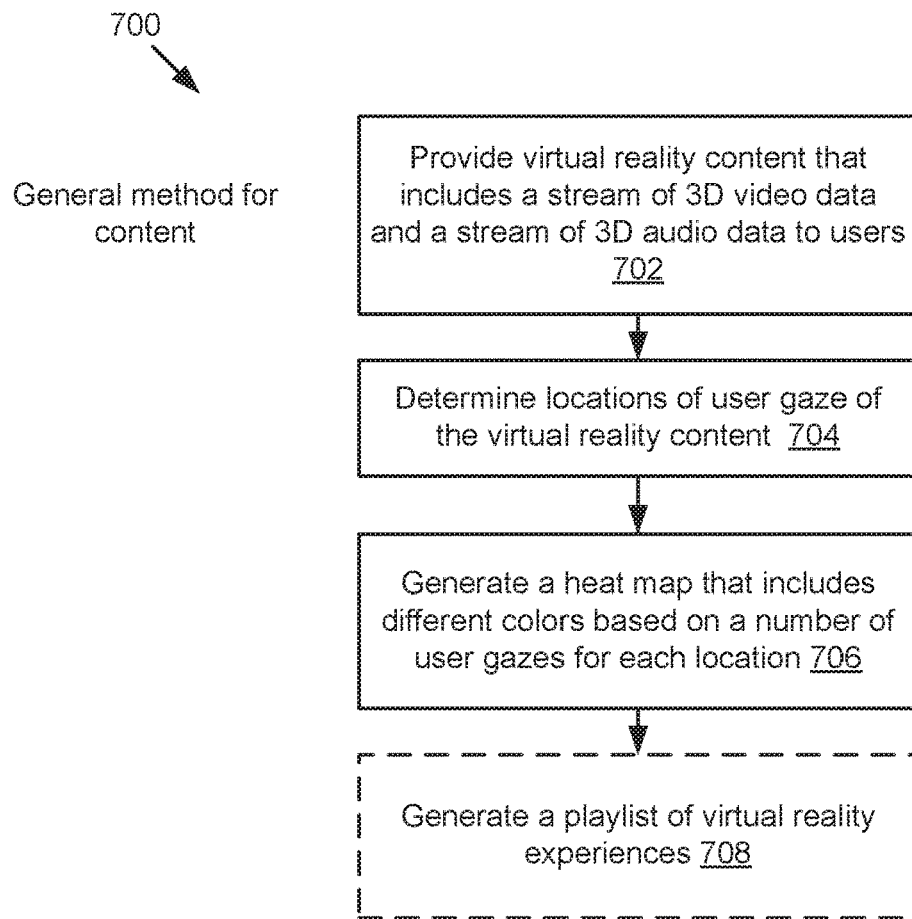
FIG. 7 illustrates an example method for analyzing virtual reality content.

FIG. 7 illustrates an example method 700 for analyzing virtual reality content. The method 700 is described with respect to FIGS. 1 and 2. Although illustrated as discrete blocks, various blocks may be divided into additional blocks, combined into fewer blocks, or eliminated, depending on the desired embodiment.

The stream combination module 214 provides 702 virtual reality content that includes a stream of three-dimensional video data and a stream of three-dimensional audio data to users. The content module 256 information about user gaze, for example, from the viewing system 133 after the stream is displayed. The content module 256 determines 704 locations of user gaze of the virtual reality content and generates 706 a heat map that includes different colors based on a number of user gazes for each location. For example, the heat map uses red to illustrate the most commonly viewed area, orange for less commonly viewed, and yellow for least commonly viewed. In one embodiment, the content module 256 generates 708 a playlist of virtual reality experiences. For example, the playlist includes most viewed virtual reality content, most highly rated virtual reality content, a playlist for a particular region, or a playlist from an expert in certain subject matter.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosures have been described in detail, it may be understood that the various changes, substitutions, and alterations could be made hereto without departing from the spirit and scope of the disclosure.

What is claimed is:

1. A method comprising:
receiving raw video data describing image frames from a set of camera modules;
constructing, from the raw video data, a left camera map by identifying matching camera modules for pixels in a left panoramic image and for each of the pixels, identifying a corresponding camera module from the matching camera modules based on a determination that the corresponding camera module has a most parallel viewing direction to a left viewing direction as compared to other viewing directions of other camera modules;
generating a stream of left panoramic images based on the left camera map;
constructing a right camera map that identifies matching camera modules for pixels in a right panoramic image;
generating a stream of right panoramic images based on the right camera map;
generating a compressed stream of three-dimensional video data from the stream of left panoramic images and the stream of right panoramic images, wherein the compressed stream of three-dimensional video data describes a 360-degree view of a scene;
providing virtual reality content that includes the compressed stream of three-dimensional video data and a stream of three-dimensional audio data to users;
receiving user gaze information that describes locations within the virtual reality content where each of the users is looking while viewing the virtual reality content;
determining locations of user gaze within the virtual reality content based on the user gaze information;
generating a heat map based on the locations of the user gaze;
using the heat map to determine that an advertisement should be placed in a location in the virtual reality content where, according to the heat map, users look less frequently compared to one or more other locations in the virtual reality content where users look more frequently;
displaying the advertisement at the location in the virtual reality content;
storing information about a user's gaze at the advertisement displayed at the location in the virtual reality content;
determining a subject of the advertisement displayed at the location in the virtual reality content; and
using the subject of the advertisement and the information about the user's gaze at the advertisement to provide one or more advertisements in a social network.

2. The method of claim 1, further comprising:
generating a set of virtual reality content, wherein the set of virtual reality content includes the virtual reality content; and
generating a playlist of virtual reality experiences from the set of virtual reality content.

3. The method of claim 2, wherein the virtual reality experiences in the playlist are ordered based on a most number of user views of the virtual reality experiences from the set of virtual reality content.

4. The method of claim 2, wherein the playlist includes the virtual reality experiences from the set of virtual reality content corresponding to a geographical location.

5. The method of claim 1, further comprising:
generating a set of virtual reality content, wherein the set of virtual reality content includes the virtual reality content; and
generating a social graph that includes an identification of the users, relationships between the users, and information about virtual content in the set of virtual reality content viewed by each of the users.

6. The method of claim 5, further comprising:
suggesting that a first user connect with a second user based on identifying from the social graph that the first user and the second user viewed same or similar virtual content from the set of virtual reality content.

7. The method of claim 5, further comprising:
providing the virtual reality content to a first user and a second user that are connected in the social graph, wherein the first user and the second user contemporaneously view the virtual reality content.

8. The method of claim 1, wherein the left viewing direction is represented by a vector that includes, for each pixel, a yaw, a pitch, and an interocular distance.

9. A non-transitory computer storage medium encoded with a computer program, the computer program comprising instructions that, when executed by one or more processors, cause the one or more processors to perform operations comprising:
receiving raw video data describing image frames from a set of camera modules;
constructing, from the raw video data, a left camera map by identifying matching camera modules for pixels in a left panoramic image and for each of the pixels, identifying a corresponding camera module from the matching camera modules based on a determination that the corresponding camera module has a most parallel viewing direction to a left viewing direction as compared to other viewing directions of other camera modules;
generating a stream of left panoramic images based on the left camera map;
constructing a right camera map that identifies matching camera modules for pixels in a right panoramic image;
generating a stream of right panoramic images based on the right camera map;
generating a compressed stream of three-dimensional video data from the stream of left panoramic images and the stream of right panoramic images, wherein the compressed stream of three-dimensional video data describes a 360-degree view of a scene;
providing virtual reality content that includes the compressed stream of three-dimensional video data and a stream of three-dimensional audio data to users;
receiving user gaze information that describes locations within the virtual reality content where each of the users is looking while viewing the virtual reality content;
determining locations of user gaze within the virtual reality content based on the user gaze information;
generating a heat map based on the locations of the user gaze;
using the heat map to determine that an advertisement should be placed in a location in the virtual reality content where, according to the heat map, users look less frequently compared to one or more other locations in the virtual reality content where users look more frequently;
displaying the advertisement at the location in the virtual reality content;
storing information about a user's gaze at the advertisement displayed at the location in the virtual reality content;
determining a subject of the advertisement displayed at the location in the virtual reality content; and
using the subject of the advertisement and the information about the user's gaze at the advertisement to provide one or more advertisements in a social network.

10. The computer storage medium of claim 9, wherein the operations further comprise:
generating a set of virtual reality content, wherein the set of virtual reality content includes the virtual reality content; and
generating a playlist of virtual reality experiences from the set of virtual reality content.

11. The computer storage medium of claim 10, wherein the virtual reality experiences in the playlist are ordered based on a number of user views of the virtual reality experiences from the set of virtual reality content.

12. The computer storage medium of claim 10, wherein the playlist includes the virtual reality experiences from the set of virtual reality content corresponding to a geographical location.

13. A system comprising:
one or more processors; and
a memory that stores instructions executed by the one or more processors, the instructions operable to cause the one or more processors to:
receive raw video data describing image frames from a set of camera modules;
construct, from the raw video data, a left camera map by identifying matching camera modules for pixels in a left panoramic image and for each of the pixels, identifying a corresponding camera module from the matching camera modules based on a determination that the corresponding camera module has a most parallel viewing direction to a left viewing direction as compared to other viewing directions of other camera modules;
generate a stream of left panoramic images based on the left camera map;
construct a right camera map that identifies matching camera modules for pixels in a right panoramic image;
generate a stream of right panoramic images based on the right camera map;
generate a compressed stream of three-dimensional video data from the stream of left panoramic images and the stream of right panoramic images, wherein the compressed stream of three-dimensional video data describes a 360-degree view of a scene;
provide virtual reality content that includes the compressed stream of three-dimensional video data and a stream of three-dimensional audio data to users;
receive user gaze information that describes locations within the virtual reality content where each of the users is looking while viewing the virtual reality content;
determine locations of user gaze within the virtual reality content based on the user gaze information;
generate a heat map based on the locations of the user gaze;
use the heat map to determine that an advertisement should be placed in a location in the virtual reality content where, according to the heat map, users look less frequently compared to one or more other locations in the virtual reality content where users look more frequently;
display the advertisement at the location in the virtual reality content;
store information about a user's gaze at the advertisement displayed at the location in the virtual reality content;
determine a subject of the advertisement displayed at the location in the virtual reality content; and
use the subject of the advertisement and the information about the user's gaze at the advertisement to provide one or more advertisements in a social network.

14. The system of claim 13, wherein the instructions are further operable to cause the one or more processors to:
  generate a set of virtual reality content, wherein the set of virtual reality content includes the virtual reality content; and
  generate a playlist of virtual reality experiences from the set of virtual reality content.

15. The system of claim 14, wherein the virtual reality experiences in the playlist are ordered based on a number of user views of the virtual reality experiences from the set of virtual reality content.

16. The system of claim 14, wherein the playlist includes the virtual reality experiences from the set of virtual reality content corresponding to a geographical location.

17. The system of claim 13, wherein the instructions are further operable to cause the one or more processors to:
  generate a set of virtual reality content, wherein the set of virtual reality content includes the virtual reality content; and
  generate a social graph that includes an identification of the users, relationships between the users, and information about virtual content in the set of virtual reality content viewed by each of the users.

18. The method of claim 1, wherein using the subject of the advertisement and the information about the user's gaze at the advertisement to provide the one or more advertisements in the social network comprises:
  determining, based on the user's gaze at the advertisement, an interest of the user in the subject of the advertisement;
  updating a social network user profile of the user to indicate the interest of the user in the subject; and
  presenting the one or more advertisements in the social network based on the social network user profile of the user.

19. The method of claim 1, further comprising:
  suggesting that the user follow another user in the social network based on the user's gaze at the advertisement.

20. The method of claim 1, further comprising:
  suggesting that the user join a group in the social network based on the user's gaze at the advertisement.

21. The method of claim 1, wherein the virtual reality content comprises a virtual reality game and the method further comprises:
  posting an update in the social network, the update indicating the user's progress in the virtual reality game, the update including a button configured to be selected by another user to provide an in-game reward to the user in the virtual reality game.

* * * * *